(12) United States Patent
Cubbage

(10) Patent No.: US 12,240,595 B2
(45) Date of Patent: Mar. 4, 2025

(54) REACTION DRIVE HELICOPTER AND METHODS FOR PROPULSION AND CONTROL

(71) Applicant: Scott Alan Cubbage, Laguna Niguel, CA (US)

(72) Inventor: Scott Alan Cubbage, Laguna Niguel, CA (US)

( * ) Notice: Subject to any disclaimer, the term of this patent is extended or adjusted under 35 U.S.C. 154(b) by 358 days.

(21) Appl. No.: 17/658,254

(22) Filed: Apr. 7, 2022

(65) Prior Publication Data

US 2023/0322372 A1   Oct. 12, 2023

(51) Int. Cl.
| | |
|---|---|
| *B64C 27/16* | (2006.01) |
| *B64C 27/06* | (2006.01) |
| *B64C 39/02* | (2023.01) |
| *B64D 27/353* | (2024.01) |
| *B64U 10/10* | (2023.01) |
| *B64U 50/19* | (2023.01) |

(52) U.S. Cl.
CPC .............. *B64C 27/16* (2013.01); *B64C 27/06* (2013.01); *B64C 39/024* (2013.01); *B64D 27/353* (2024.01); *B64U 10/10* (2023.01); *B64U 50/19* (2023.01)

(58) Field of Classification Search
CPC ......... B64C 27/16; B64C 29/02; B64U 10/10; B64U 10/13
See application file for complete search history.

(56) References Cited

U.S. PATENT DOCUMENTS

| | | | | |
|---|---|---|---|---|
| 2,444,781 | A * | 7/1948 | Leonard ................. | B64C 29/02 244/7 B |
| 3,116,040 | A * | 12/1963 | Petrides ................. | B64C 27/18 244/7 B |
| 5,297,759 | A * | 3/1994 | Tilbor .................... | B64U 50/23 244/17.11 |
| 7,093,788 | B2 | 8/2006 | Small | |
| 8,991,751 | B2 * | 3/2015 | Page ..................... | B64C 39/024 244/78.1 |
| 9,085,354 | B1 * | 7/2015 | Peeters .................. | B64C 17/00 |
| 9,567,075 | B2 * | 2/2017 | Tighe .................... | B64U 50/13 |
| 9,688,398 | B2 * | 6/2017 | Page ..................... | B64U 30/12 |

(Continued)

FOREIGN PATENT DOCUMENTS

FR    3048956 A1 *  9/2017  ............ B64C 27/16

*Primary Examiner* — Philip J Bonzell

(57) ABSTRACT

Disclosed is an electrically powered, reaction-drive type rotorcraft. Thrust generators on the outer portion of each rotor blade cause the rotors to spin and generate lift, and additionally, may be controlled to produce variable amounts of thrust as the rotor blades rotate through different sectors around a generally non-rotating fuselage such that net lateral forces are produced to control the position and velocity of the vehicle. The rotorcraft may also employ aerodynamic surfaces on each rotor blade whose parts or entire structure can be moved to produce net lateral and vertical forces for control of position and velocity of the vehicle. The rotorcraft, which may be operationally carbon-neutral, stores its electrical energy in batteries and other optional energy storage methods, and may harvest solar energy using arrays of photovoltaic cells disposed on its upper surfaces. Vehicle sizes may range from small Uncrewed Air vehicle Systems to large crewed aircraft.

6 Claims, 16 Drawing Sheets

(56) References Cited

U.S. PATENT DOCUMENTS

| | | | | |
|---|---|---|---|---|
| 2012/0248259 A1* | 10/2012 | Page | .................... | B64C 39/024 |
| | | | | 244/7 B |
| 2014/0008498 A1* | 1/2014 | Reiter | .................... | B64U 30/40 |
| | | | | 244/99.11 |
| 2015/0028155 A1* | 1/2015 | Reiter | ................ | B64C 29/0033 |
| | | | | 244/39 |
| 2015/0183514 A1* | 7/2015 | Page | .................... | B64U 30/12 |
| | | | | 244/7 A |
| 2015/0225071 A1* | 8/2015 | Tighe | .................... | B64C 29/02 |
| | | | | 244/12.4 |

* cited by examiner

Section 4c - 4c

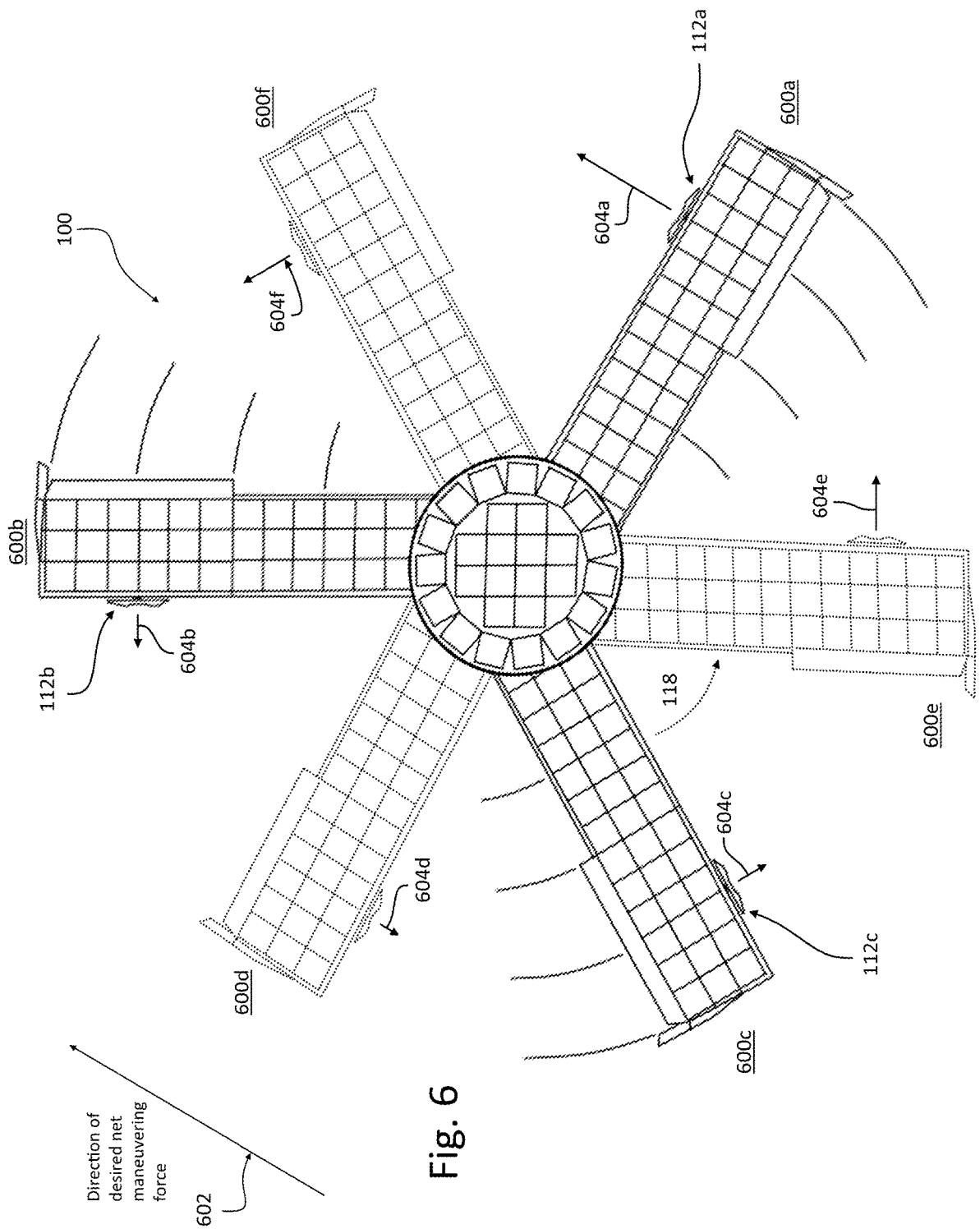

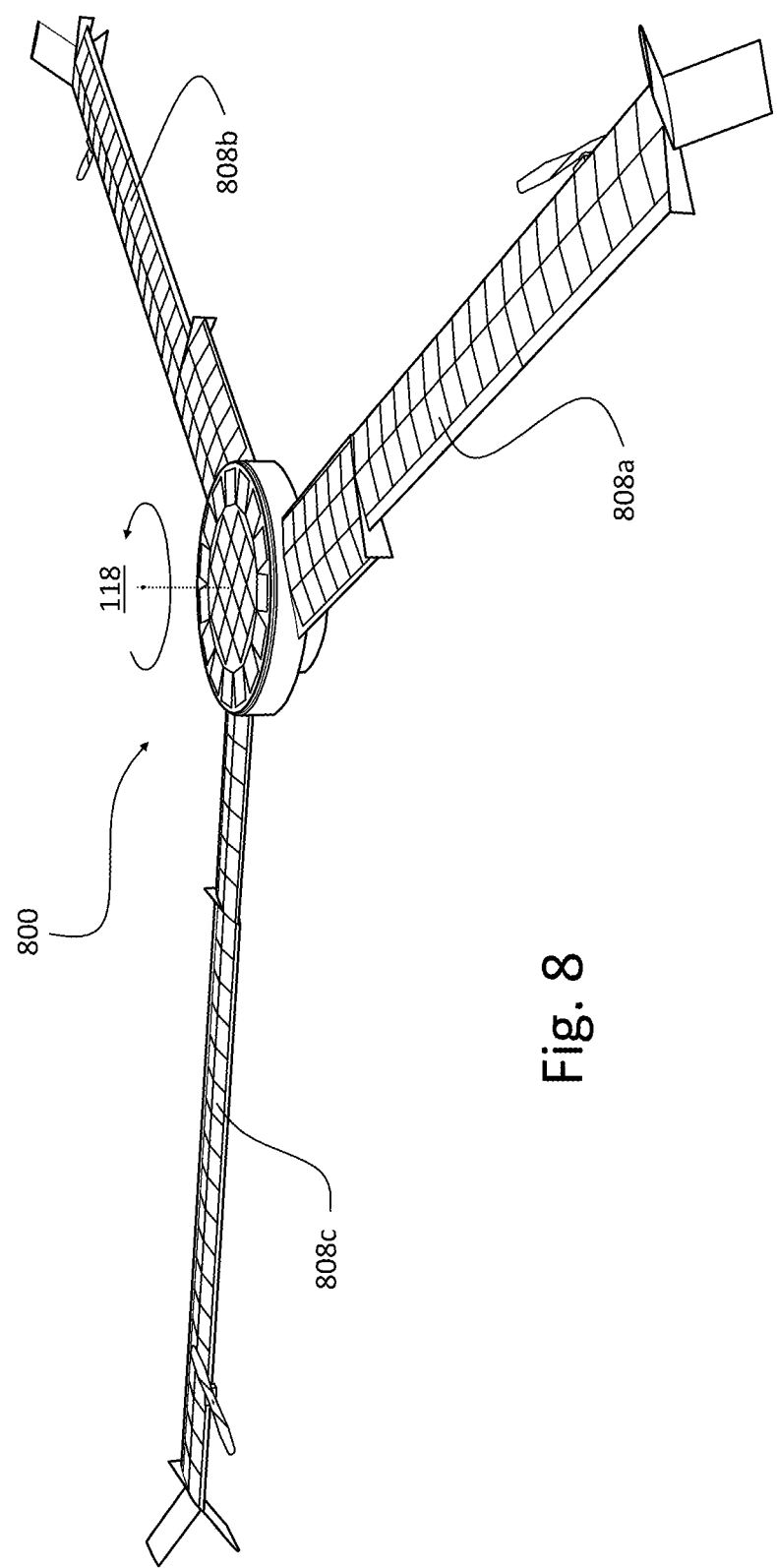

REACTION DRIVE HELICOPTER AND METHODS FOR PROPULSION AND CONTROL

CROSS-REFERENCE TO RELATED APPLICATIONS

This application claims the benefit of U.S. application No. 63/172,592, which was filed on Apr. 8, 2021, the entirety of which is hereby incorporated by reference.

STATEMENT REGARDING FEDERALLY SPONSORED RESEARCH AND DEVELOPMENT (Not Applicable)

BACKGROUND OF INVENTION

The present disclosure relates to the field of uncrewed or crewed rotary-wing aircraft, or rotorcraft. More specifically, the present disclosure relates to rotorcraft having thrust generators mounted on the rotors.

Rotorcraft such as crewed helicopters and uncrewed drones provide highly desired performance advantages such as the ability to take off and land vertically, and to hover during flight. However, such rotorcraft are plagued by inefficiencies, most notably mechanical complexity and frictional losses in the drivetrain, coupled with aerodynamic drag losses as the tips of the rotor blades often approach supersonic speeds. These inefficiencies combine to severely limit the flight endurance time because the onboard energy stored as fossil fuel or battery-stored electrical power are quickly expended. Previous systems have also been plagued by slow and non-intuitive responses to control inputs due to the high rotational inertia of the rotor system, the necessity of changing the general plane of rotation of the rotor system for vehicle control, and gyroscopic precession inherent in the spinning mass of the rotor system.

One relatively recent solution to the precision of control problem has been the advent of battery-powered uncrewed multi-rotor drones. These drones have become popular for their ability to carry a payload, such as cameras, sensors and the like, and to maintain such payload in a controlled location as desired. However, due to the high propeller speeds and the attendant aerodynamic drag, the on-board energy tends to be consumed fairly quickly, and the drone thus must be taken out of service. Further, charging batteries and reconfiguring the drones for the next flight can be time-consuming. Thus, such drones typically must be taken out of service for substantial periods of time.

BRIEF SUMMARY OF INVENTION

The present disclosure discloses aspects that improve airborne service operating time for electrically-powered rotorcraft, and also improves the ability for such rotorcraft to be returned to airborne service relatively quickly. The present disclosure also discloses aspects that improve precision of control, and efficiency of electrically-powered rotorcraft.

For example, one embodiment discloses structure that allows a small uncrewed rotorcraft to launch in the early morning from a level area roughly the size of two standard car parking spaces, perform aerial photographic survey for the entire sunlit day, and then return to its launching space to land—without ever directly or indirectly causing climate changing emissions. This mode of operation is made possible by aerodynamic efficiencies of the air vehicle system, and, in this embodiment, by the ability of the system to harvest solar energy while in flight in order to supplement electrical energy stored in onboard batteries.

Other embodiments disclose structure and elements capable of assuming a highly accurate hovering position to support airborne relay of communication signals from, for example, the site of a natural disaster, for many hours at a time, whether in daylight or the darkness of night. In an environment where the level of first-responder and humanitarian aid air traffic may be substantial, the ability of an air vehicle to occupy a fixed volume of airspace on the order of a few cubic meters can be significant. Contrast this with an equivalently tasked fixed-wing aircraft which can easily require cordoning off 6 to 8 orders of magnitude more airspace volume for its operations and will have a constantly changing position and orientation which may affect signal availability.

According to one aspect of the invention, this disclosure describes an air vehicle system capable of precise control of position and long time-duration of flight. The system, which comprises an electrically powered rotorcraft with a generally non-rotating fuselage and a rotor attachment ring assembly with spinning wings to generate lift. The air vehicle has control capability to command thrust from onboard thrust generators to maintain rotor attachment ring assembly rotational speed, to variably control the amount and direction of lift produced by the spinning wings, or rotors, and to variably control thrust from onboard thrust generators as a function of their position with respect to the orientation of the fuselage so that the rotorcraft moves and behaves in a useful and controlled manner.

In embodiments, each rotor includes aerodynamic wing fences or winglets configured and controlled to generate additional control forces through all sectors of each rotor's rotation about the fuselage, which are sufficient to facilitate maneuvering and station keeping for the air vehicle.

In embodiments, each rotor includes a flapping hinge outboard of the root of the rotor to improve the passive stability of the air vehicle.

In embodiments, each rotor has facility for mounting and control of one or more direct lift force control surfaces, which act collectively to control the sum of the amount of lift force on the aircraft created by all of the rotors.

In embodiments, each rotor includes a flapping hinge with configuration to allow generation of lateral control forces in response to control inputs which alter the lift of the outer portion of the rotor. The rotation of the outer portion of the rotor about the flapping hinge alters the direction of the lift force vector generated. When controlled cyclically, maneuvering forces are generated on the rotor, the rotor ring, and the fuselage, and the vehicle as a whole for maneuvering and station keeping.

In embodiments, each rotor is modularly replaceable and readily interchanged for such benefits as exchange of rotors with spent batteries for fully charged rotors, providing variety of payloads carried, and adjustment of aerodynamic performance capability in response to mission requirements or environmental factors.

In embodiments, derived command outputs from a systems control computer are sent to rotors by way of rotatably free digital communication channels which include redundancy and error correction facilities to insure data integrity despite no fixed mechanical connection between the non-rotating fuselage and the spinning rotors. In a similar fashion, status information is relayed from the rotors back to the systems control computer so as to provide a comprehensive indication of the operational state of the vehicle.

In embodiments, the air vehicle, through its systems control computer, accepts and implements human-issued command inputs relayed through appropriate interfaces and facilities.

In embodiments, the air vehicle, through its systems control computer, operates with a high degree of autonomy by determining appropriate actions within high level decision-making computer program processes, determining commands to achieve the actions, and implementing the commands through command input channels that are substantially the same as those for human-issued commands.

In embodiments, each rotor includes a feathering hinge and active aerodynamic control of the outer portion of each rotor to facilitate collective control of the angle of attack of the outer portion of each rotor and thus control the amount of lift generated by the rotors.

In embodiments, each rotor includes a feathering hinge and active aerodynamic control of the outer portion of each rotor to facilitate cyclic control of the angle of attack of the outer portion of each rotor through all sectors of its rotation about the fuselage and thus control the amount of lateral maneuvering forces generated by the rotors.

In embodiments, the air vehicle includes an array of photovoltaic cells disposed on the upper surface of the fuselage which collects solar energy and communicates electrical power to the power supply within the fuselage;

In embodiments, the air vehicle includes an array of photovoltaic cells disposed on the upper surface of each rotor which communicates electrical power to its constituent power supply;

In embodiments, the air vehicle includes facilities to mount 2, 3, 4, 5, or 6 separate rotors to the rotor attachment ring such that the most appropriate configuration is employed for a particular flight mission.

In embodiments, the air vehicle includes provisions to store supplementary chemical forms of energy within the fuselage, convert the energy to electrical power, and to communicate electrical power to the power supply within the fuselage;

In embodiments, the air vehicle includes provisions to store supplementary chemical forms of energy within one or more rotors, convert the energy to electrical power, and to its constituent power supply;

BRIEF DESCRIPTION OF THE SEVERAL VIEWS OF THE DRAWING

FIG. 6 is a top view of an embodiment of a utility air vehicle, depicting generation of lateral forces by modulation of thrust generated by rotors at multiple locations about their rotation;

FIG. 8 is a perspective view of another embodiment of a utility air vehicle.

DETAILED DESCRIPTION OF THE INVENTION

Figure 1:
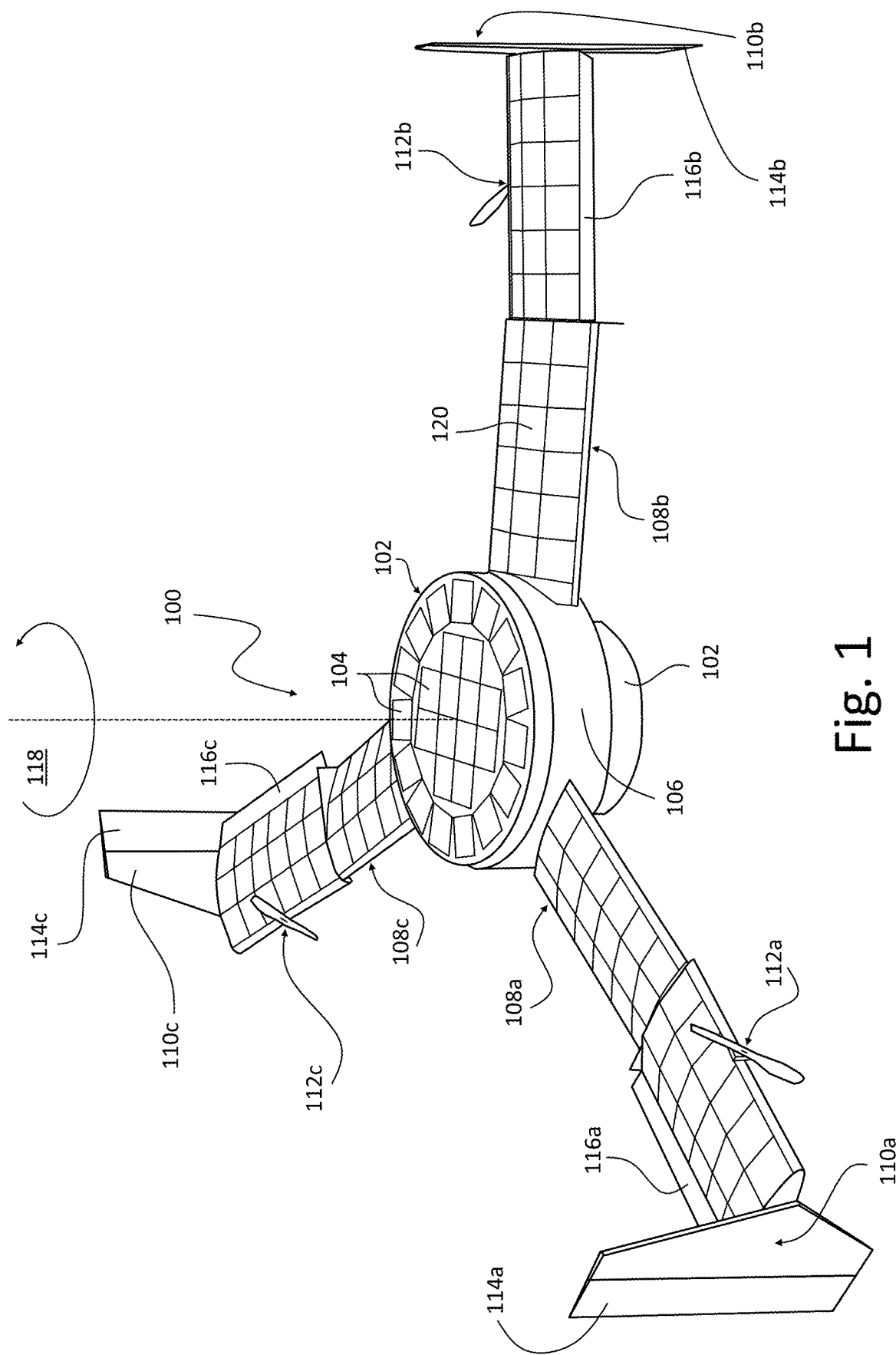
FIG. 1 is a perspective view of a utility air vehicle in accordance with an embodiment.

The present disclosure discusses inventive aspects that yield improvements in the carbon footprint, flight endurance time, and precision of control of velocity and position for rotorcraft. The principles discussed herein can apply to both crewed or uncrewed vertical takeoff and landing flight vehicles. As will be discussed in more detail below in connection with specific embodiments, a rotorcraft is contemplated having a non-rotating fuselage portion, a rotor attachment ring, and a plurality of rotating rotors extending radially outwardly from the rotor attachment ring. The term rotor in the present disclosure refers to the structure that is also sometimes referred to in the art as a rotary wing or rotor blade. Each rotor may be independently capable of storing electrical energy for flight, harvesting solar energy for flight, providing motive power for flight, and providing the specific aerodynamic surface control and propulsion control so that the velocity and position of the aircraft as a whole are controllable and useful.

With initial reference to FIGS. 1-4, an embodiment of an uncrewed utility air vehicle 100 comprises a minimalistic cylindrical fuselage 102 that may be configured to house flight control, communications, and mission payload components 440, as well as batteries that store energy necessary to power the various components. An array of solar photovoltaic cells 104 may be arranged on the upper surface of fuselage 102 to harvest any available solar energy. A rotor attachment ring 106 may be rotatably attached to the fuselage 102 and fixedly attached to the depicted individual rotors 108a, 108b, 108c. The rotors 108a-c may employ semi-symmetrical airfoil sections and may each have an array of solar photovoltaic cells 120 arranged on the upper surface. Mounted at a location along the outer portion or at the distal tips of each rotor, there may be provided one or more aerodynamic fences or "winglets" 110a, 110b, 110c configured to increase the apparent aspect ratio, and thus reduce the induced drag of the rotor. These winglets may be arrayed above, below, or both above and below the main corpus of each of the rotors 108a, 108b, 108c depending on the particular embodiment. A plurality of winglets 110a, 110b, 110c may also be arrayed at the distal tips of rotors 108a, 108b, 108c. As will be discussed below in connection with additional embodiments, by articulation of certain parts, the winglets 110 may be caused to generate a variety of vertical, radial, and tangential forces. An improvement in precision of control is realized using this method because a maneuvering or corrective force may be generated almost instantaneously instead of a force created by tipping the entirety of the rotor disk, which suffers a delayed and out-of-axis response due to rotational inertia and gyroscopic precession effects.

Figure 2:
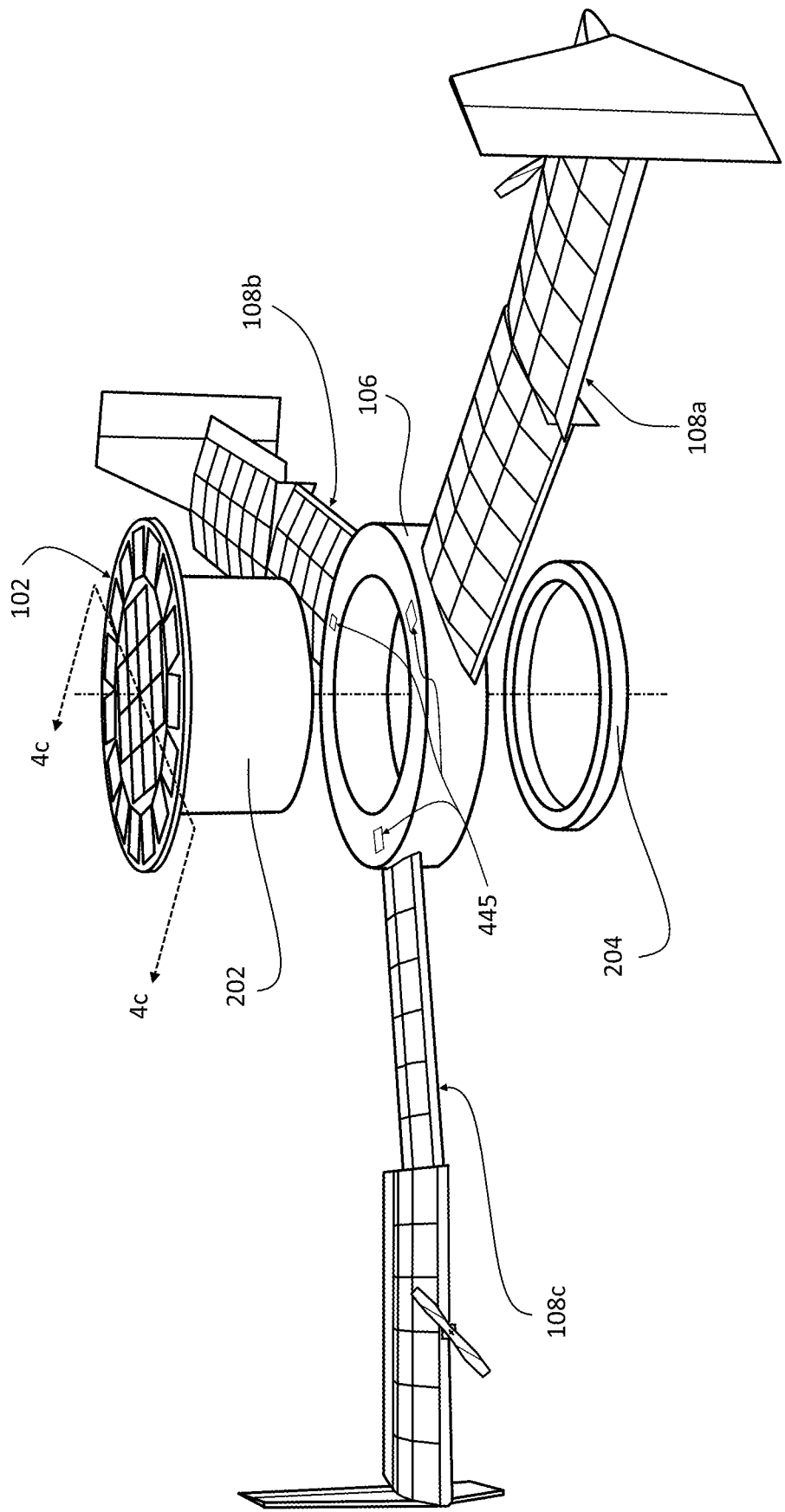
FIG. 2 is a partially exploded view of the vehicle of FIG. 1.

With particular reference to FIGS. 1 and 2, a thrust generator 112a, 112b, 112c can be mounted either within or external to an outer section of each of the rotors 108a, 108b, 108c. In preferred embodiments, and as will be discussed in more detail below, the thrust generators 112 can be variably throttled in different sectors of a particular rotor's rotation about a spin axis 118 of the utility air vehicle 100 to maintain the rotational speed of the rotor assembly as well as to generate direct, net lateral force on the utility air vehicle 100. Like the direct forces generated by the control surfaces on the winglets 110 mentioned above, variable throttling of the thrust generators 112 accrues the control advantage of near-instantaneous generation of lateral control forces when needed.

In the embodiment illustrated in FIG. 1, the thrust generator 112 comprises an electric motor turning a propeller to produce thrust. The thrust generator 112 is attached to the leading edge of the rotor 108. However, it is to be understood that the thrust generator may be attached to the leading edge of the rotor, the trailing edge of the rotor, or above, below, or within the corpus of the rotor blade structure with any accommodation for entraining and accelerating airflow to produce thrust. As such, it is contemplated in the embodiment illustrated in FIG. 1 that the motor and propeller can act in either the tractor or pusher configuration.

Each winglet 110a, 110b, 110c can include one or more control surfaces 114a, 114b, 114c, each of which can generate a drag force, a lateral 'lift' force, or a combination of both as its attached rotor 108a, 108b, 108c spins through different sectors around spin axis 118 as needed for control of air vehicle 100. Further, one or more lift-force control surfaces 116a, 116b, 116c can be included with the rotor 108, and can be configured to produce both collective and cyclic lift force through rotors 108a, 108b, 108c. In the embodiment illustrated in FIGS. 1 and 2, the lift-force control surfaces 116a, 116b, 116c are connected to the trailing edge of the rotors 108a, 108b, 108c and may operate much the same as an aileron or flap control surface on a conventional airplane wing. It is to be understood that each lift-force control surface 116a, 116b, 116c serves to adjust the upward lift force of the rotors 108a, 108b, 108c as they spin through different sectors of their rotation about fuselage 102 to facilitate control of velocity and position of air vehicle 100. The lift-force control surfaces may also be arrayed in a multitude of locations and be of additional configurations including but not limited to leading-edge control surfaces, trim- or servo-tab surfaces, camber changing facilities, or thrust deflectors placed in the wake of the thrust generators 112a, 112b, 112c to change the circulation of airflow around the rotor blade and therefore change the lift generated. It is contemplated that various embodiments of each of these control elements, including multiple instances distributed along the span or chord of the rotor, will likely have beneficial or detrimental effects on different aspects of flight and performance.

It is contemplated that a rotorcraft air vehicle 100 in accordance with this disclosure can be configured in a broad range of sizes and diameters. In a preferred embodiment the air vehicle 100 has a rotor disk span in the range of approximately 3-8 meters, and more preferably about 4-6 meters. Preferably, the rotors may spin at a speed on the order of 80-150 revolutions per minute (RPM), more preferably about 90-120 RPM, and most preferably about 100 RPM. This is in high contrast with most conventional helicopters which have a rotor speed from about 200 RPM to about 600 RPM, or quad-rotor propellers which have speeds approaching or exceeding 10,000 RPM.

Construction of the air vehicle 100 may employ materials and methods as are in keeping with best practices currently in use in the industry. It will be recognized by one with skill in the art that the choice of elements and the overall size and configuration of any particular embodiment of the invention may reflect engineering trade-offs made to optimize performance in particular flight missions. Further, as more advanced and advantageous materials, components, and manufacturing techniques become available they may be employed as best suited to embodiments of the present invention. A wide variety of architectures and configurations may be possible without departing from the spirit and scope of the present invention.

With specific reference to FIG. 2, the fuselage comprises a non-rotating hub 202 encircled by a rotor attachment ring 106. The fuselage 102 supports the rotor attachment ring 106, to which the rotors 108a, 108b, 108c are attached so as to extend radially outwardly from the rotor attachment ring 106. In addition to the rotor attachment ring 106, the fuselage 102 supports the rotors 108a, 108b, 108c at all times when the rotors are stationary (e.g. the air vehicle 100 is on the ground and not in flight) or are not yet developing enough lift to support themselves. This particular simplified embodiment depicted provides for a rotor ring support collar 204, securely attached to the surface of the non-rotating hub 202 on the exterior surface of the fuselage 102, which supports the rotor attachment ring 106 and its attached rotors.

Low-friction bearings or bearing surfaces may be provided to minimize drag torque while the fuselage remains pointing along the same direction or heading, supported by the rotor attachment ring 106 and its spinning rotors 108a, 108b, 108c while in flight. Likewise, the fuselage may support the rotor attachment ring 106 and its spinning rotors 108a, 108b, 108c using similar bearings or bearing surfaces when not in flight. Bearings notwithstanding, it may be difficult to completely eliminate the drag force at the bearings or bearing surfaces which gives rise to a torque moment which works to slow the rotation of the rotor attachment ring 106 and its spinning rotors 108a, 108b, 108c and may cause the fuselage 102 to begin to spin in the same direction as the rotation of rotor attachment ring 106 and its attached parts.

Figure 3A:
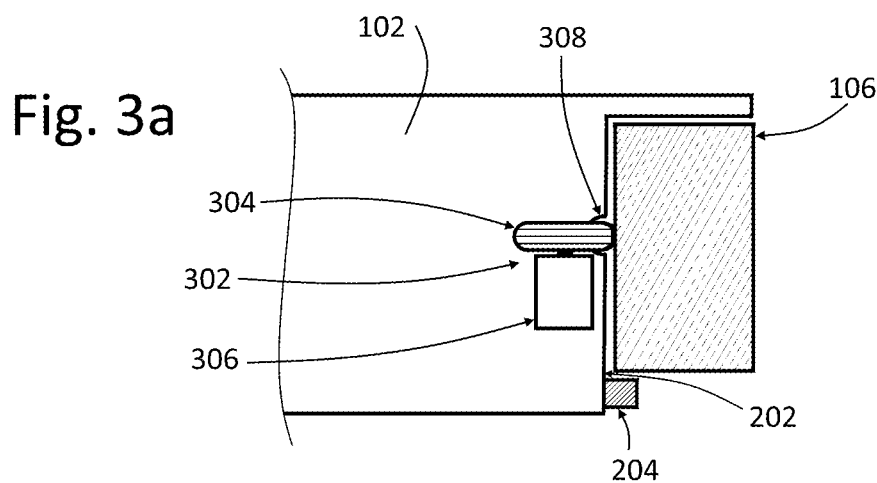
FIG. 3a is a partial sectional view of a portion of a fuselage depicting an embodiment of an anti-rotation structure.
Figure 3B:
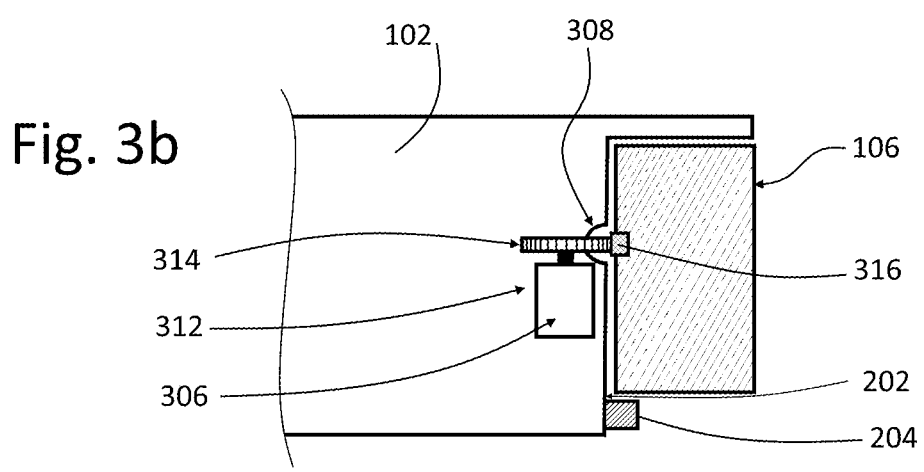
FIG. 3b is a partial sectional view of a portion of the fuselage depicting another embodiment of an anti-rotation structure.
Figure 3C:
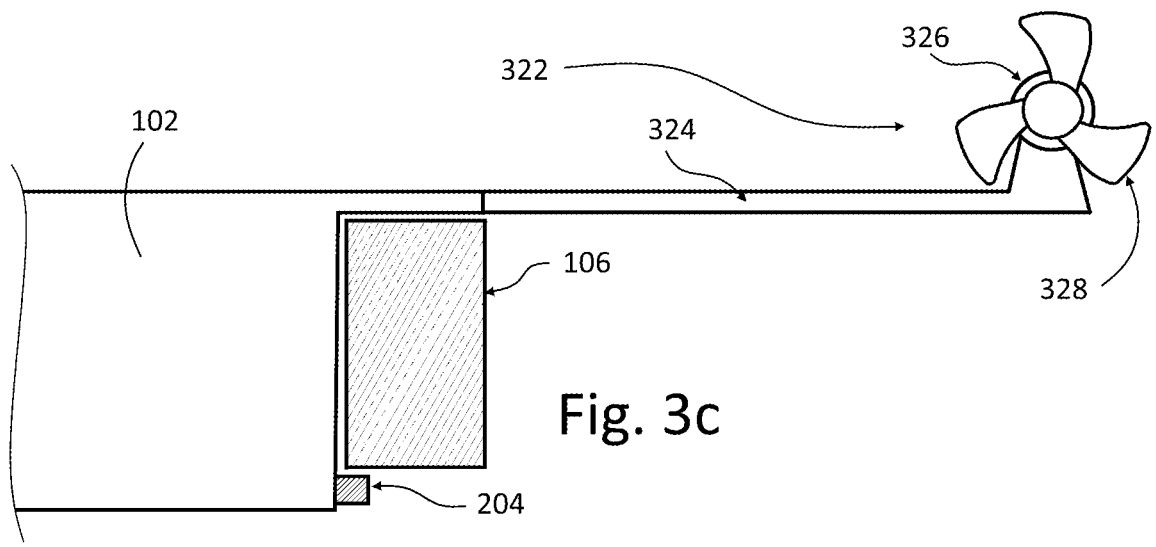
FIG. 3c is a partial sectional view of a portion of the fuselage depicting yet another embodiment of an anti-rotation structure.

FIGS. 3a, 3b, and 3c depict embodiments of anti-rotation structures configured to stabilize and control the rotation angle of the non-rotating hub 202 and fuselage 102 with respect to the rotor attachment ring 106 and its attached rotors 108a, 108b, 108c. The hub 202 and fuselage 102 may be made to remain stationary or controllably rotated by one or more of a multitude of devices and methods, some of which are depicted in FIG. 3. The skilled artisan will recognize the requirement to control the heading angle of the fuselage 102, the function of each of the examples in FIGS. 3a, 3b, and 3c, and that a large variety of methods may be used to accomplish this function without departing from the spirit and scope of the present invention.

FIG. 3a is a section view including the fuselage 102, the rotor attachment ring 106, the rotor ring support collar 204, and a friction drive assembly 302. The friction drive 302 is rigidly mounted and housed within the fuselage 102 and protrudes through an opening 308 in the non-rotating hub 202. The friction drive comprises a semi-pneumatic tire element 304 and an electric motor 306. The tire element 304 has a compliant, interference fit so that friction helps develop traction forces as it runs against the inner surface of the rotor attachment ring 106. The electric motor 306 may turn the tire element 304 at a speed necessary to match the rotational speed of the rotor attachment ring 106 thus keeping the fuselage 102 always pointing the same direction while the rotor attachment ring 106 and its attached rotors 108a, 108b, 108c spin at rotational speeds necessary to sustain flight. Alternatively, the electric motor 306 may turn the tire element 304 at a speed slightly faster or slower than the rotational speed of the rotor attachment ring 106 in order to alter the heading angle of the fuselage 102 as desired.

FIG. 3b is a section view including the fuselage 102, the rotor attachment ring 106, the rotor ring support collar 204, and a gear drive assembly 312. The gear drive assembly 312 is rigidly or compliantly mounted and housed within the fuselage 102 and protrudes through the opening 308 in the non-rotating hub 202. The gear drive assembly 312 comprises a pinion gear element 314 and the electric motor 306. The pinion gear element 314 engages a larger ring gear 316 embedded into the inner surface of the rotor attachment ring 106. The electric motor 306 may turn the pinion gear element 314 at a speed necessary to match the rotational speed of the rotor attachment ring 106 thus keeping the fuselage 102 always pointing the same direction while the rotor attachment ring 106 and its attached rotors 108a, 108b, 108c continuously spin at rotational speeds necessary to sustain flight. Alternatively, the electric motor 306 may turn the pinion gear element 314 at a speed slightly faster or slower than the rotational speed of the rotor attachment ring 106 in order to alter the heading angle of the fuselage 102 as desired.

FIG. 3c is a section view including the fuselage 102, the rotor attachment ring 106, the rotor ring support collar 204, and an anti-torque rotor assembly 322. The anti-torque rotor assembly 322 is mounted to the fuselage 102 and protrudes beyond the edge of rotor attachment ring 106 with enough clearance to avoid the spinning rotors 108a, 108b, 108c, much the same as the tail rotor of a conventional helicopter. The anti-torque rotor comprises a structural arm 324, an electric motor 326, and a fan or propeller 328. Power is supplied to the electric motor and modulated as necessary from control systems within the fuselage 102. The electric motor 326 may turn the propeller 328 at a speed necessary to create a force at the center of action of the propeller for a torque of equal magnitude and opposite direction from the drag torque from the rotational bearings thus keeping the fuselage 102 always pointing the same direction while the rotor attachment ring 106 and its attached rotors 108a, 108b, 108c spin at rotational speeds necessary to sustain flight. Alternatively, the electric motor 326 may turn the propeller 328 at a speed slightly faster or slower than that necessary to exactly counter the drag torque from the rotational bearings. In this manner it is possible to alter the heading angle of the fuselage 102 as desired.

While not in flight, the air vehicle 100 may be supported on landing gear (not depicted) connected to the fuselage 102, or the fuselage 102 may rest directly on the ground or landing surface, supported by a reinforced lower portion of the fuselage 102.

With specific reference next to FIGS. 2, 4a, 4c and 4d, a vehicle control system may comprise a plurality of sensors 401, a central flight control computer, servo-actuators, electronic speed controls, power management electronics, and a plurality of interface devices to facilitate operation. Most of the systems and devices may be commercially available and may be chosen due to function, cost, complexity, ease of maintenance, and deployment considerations.

A systems control computer 420, which may comprise multiple digital and analog computing devices, have non-volatile memory storage, and receive command inputs 418 from a plurality of possible sources, may be enclosed within the fuselage 102, to which payload components 440, such as a camera and/or sensor array for making observations, may be attached. In the crewed instance, these command inputs 418 may be human inputs in the form of button press sequences, knob position selections, and flight controls positions. In the uncrewed case, these inputs may come from radio frequency (RF) transceiver 417, 415 data links with one or more remote control stations 405 on the ground. A transceiver pair 417, 415 may provide wireless communication between the air vehicle 100 and a remote control station 405. In a fully autonomous case, the command inputs 118 may come from a high level decision engine with command specificity provided by a sort of operational autopilot.

Control of the air vehicle 100 via the systems control computer 420 requires a plurality of sensors 401 so that a high degree of accuracy regarding the state (position, orientation, velocity) of the vehicle may be derived. Fusion of the sensor data may be accomplished using state estimator software elements that model the amount of error inherent in each sensor and place the appropriate weight on each element of the data so that an optimal estimate of the vehicle state is produced. This derived vehicle state may be compared to a commanded or desired state, and control commands may be produced to move the vehicle to the desired state. One skilled in the art will recognize that this core control capability of the system is of prime importance, but that in this regard, myriad embodiments of the present invention can exist and fulfill the basic function without departing from the spirit and scope of the present invention.

The array of sensors employed by the present invention may include, but are not limited to the following examples:

A temperature sensor 402 and/or a barometric pressure sensor 404 may be used to provide atmospheric information to the systems control computer, which may in turn be used to optimize vehicle performance, considering factors such as the air density in which the air vehicle 100 is flying.

Position, and by derivation of the change in position over time, velocity may be derived using sensors such as an optical flow velocity sensor 410 and a global navigation satellite system (GNSS) receiver 406. The accuracy of the GNSS receiver may be significantly improved using RF-linked signals 408 from ground stations for facilities such as wide area augmentation service (WAAS) and real-time kinematic (GPS RTK) methods with Radio Technical Commission for Maritime (RTCM) corrections. Distance above the ground may be provided by an acoustic method altimeter (typically ultra-sound) 412 or an electromagnetic spectrum altimeter (typically laser light or radio frequency) 414. Finally, orientation, acceleration, and by integration, velocity information may be provided by a plurality of specific sensors to measure acceleration, gyroscopic angular rates, and strength and orientation of the local magnetic field. Collectively, with the appropriate filtering and fusion of the raw data from these sensors, an integrated module is formed which often referred to as an inertial measurement unit (IMU) or inertial measurement system 416.

The systems control computer 420, which may be housed within the fuselage 102, performs multiple control functions for the safe and effective operation of the air vehicle 100. A supplementary power source 432 for operation of the systems within the fuselage 102 may be provided by, for example, its own array of photovoltaic cells 104 for harvesting solar energy. The supplementary electric power may be communicated to a power supply 433, which may include a power conditioner such as a charge controller 434 to convert supplementary electric power to a level appropriate to charge a battery energy storage 438 carried within the fuselage 102. The power supply 433 may also include a battery management system 436 configured to monitor and control the battery energy storage 438 which, it is to be understood, may be made up of one or more modular packs of batteries. A fuselage-side signal coupling 442 can be configured to communicate, through transmit/receive coupling stations 443, 445 with a rotor-side signal coupling 444 to facilitate data exchange therebetween.

Chief among the control functions of the systems control computer 420 are the flight control system functions. At the lowest level, flight control functions termed inner-loop flight control functions serve to augment the controllability and stability of the vehicle. These functions augment any natural stability of the air vehicle 100 to resist perturbations due to, e.g. local wind gusts, by providing for active changes in the control surfaces and thrust generators of the vehicle to more quickly return to the desired position, velocity, and orientation commanded prior to the disturbance. Inner-loop flight controls may additionally enhance the vehicle's response to control inputs. From the control perspective, above the inner-loop flight control functions, are the outer-loop and operational autopilot flight control functions. These functions may actively plan for a sequence of positions and velocities, and derive the vehicle orientations needed to accomplish the maneuver. These functions may further calculate required flight profiles that are multiple flight sequences required for mission success based on local terrain, environmental conditions, vehicle performance limitations, or regulatory limitations. It is to be understood that various embodiments of these control elements can be employed so long as they provide for effective operation of air flight vehicles.

Control of the vehicle provided by the systems control computer 420 may be facilitated by elements such as a fuselage heading control angle system 422 (examples of which were described in FIG. 3a, 3b, 3c). The systems control computer 420 may additionally manage communication with and state of additional vehicle systems 424 such as anti-collision lighting, a landing configuration system (gear, lighting, special sensors), payload control, communications links, and energy management. Control of vehicle subsystems by the systems control computer 420 may be facilitated by elements such as command signals sent to the rotors 108a, 108b, 108c, and may be derived by the systems control computer 420 in the form of collective and cyclic rotor commands 426, which generally apply to all rotors, and individual rotor commands 428 which may apply specifically to individual rotors based on differences in individual rotor status 430. Cyclic rotor commands may take the form of a two-value command which includes 1) a maximum amplitude command and 2) the phase angle or rotor sector in which the maximum control amplitude is to be applied. Elements of individual rotor status 430 may include such data as a current rotor RPM speed, rotor battery temperature and charge state, and rotor rate of charge or discharge of the rotor battery system.

Communication of the control and status system between the systems control computer 420 and the individual rotor systems 450 may be accomplished in a variety of ways. Data must flow to and from the rotating rotor attachment ring 106 and rotors 108a, 108b, 108c, from and to the systems in the fuselage 102 which may not be rotating at all. Electrically-coupled slip rings may be employed to allow communication between the two parts of the air vehicle 100. Short range radio frequency communication may also be used. Optical communication, which uses light energy to send coded messages across short gaps, may also be used to facilitate data transfer to and from the rotors. If the choice of optical communication is constrained to occur during only specific rotation angles when a particular rotor is in a particular sector of its rotation about the spin axis 118, then transmit/receive coupling stations 443, 445 may be arrayed to ensure adequate separation in time between communication between the fuselage and each individual rotor. Further, data communication can be configured so as to be limited to communicating bursts of data when transmit/receive coupling stations 443, 445 are aligned. Facility for power and signal conditioning for transmit/receive coupling stations 445, 443 may be provided in each rotor as rotor-side signal coupling 444 and in the fuselage 102 as fuselage-side signal coupling 442.

Still further, in some embodiments, data communication between the fuselage 102 and rotors 108 may use fundamentally different operating principles than data communications between the fuselage 102 and a remote control station 405. For example, communications between the fuselage 102 and the remote control station 405 can be accomplished via radio frequency wireless signals, but communications between the fuselage 102 and rotors 108 can be accomplished wirelessly by optical, line of sight communication or by wired communications via slip rings. As such, communication between the fuselage 102 and rotors 108 is unlikely to interfere with communication between the fuselage 102 and remote control station 405.

In parallel with control functions, the systems control computer 420 may provide elements such as safety and logistical function in the operation of air vehicle 100. Communication between the systems control computer 420 and the rotors 108a, 108b, 108c may be subject to data transmission error and interruption. The communications protocol used between them may incorporate techniques such as data bit parity, guard bits or words, checksum verification, or self-correcting codes to ensure the integrity of the data sent in individual packets. It may employ techniques such as rolling codes, cyclical redundancy codes, and inter-packet timing to ensure that fresh data is always available or stale data is recognized and compensated for. In the event of a sustained loss of data integrity or currency, the control protocols of either or both of the systems control computer 420 or the individual rotor systems 450 may call for configuration of the vehicle or parts of the vehicle for safest return to a low-risk and/or secure landing area.

Figure 4A:
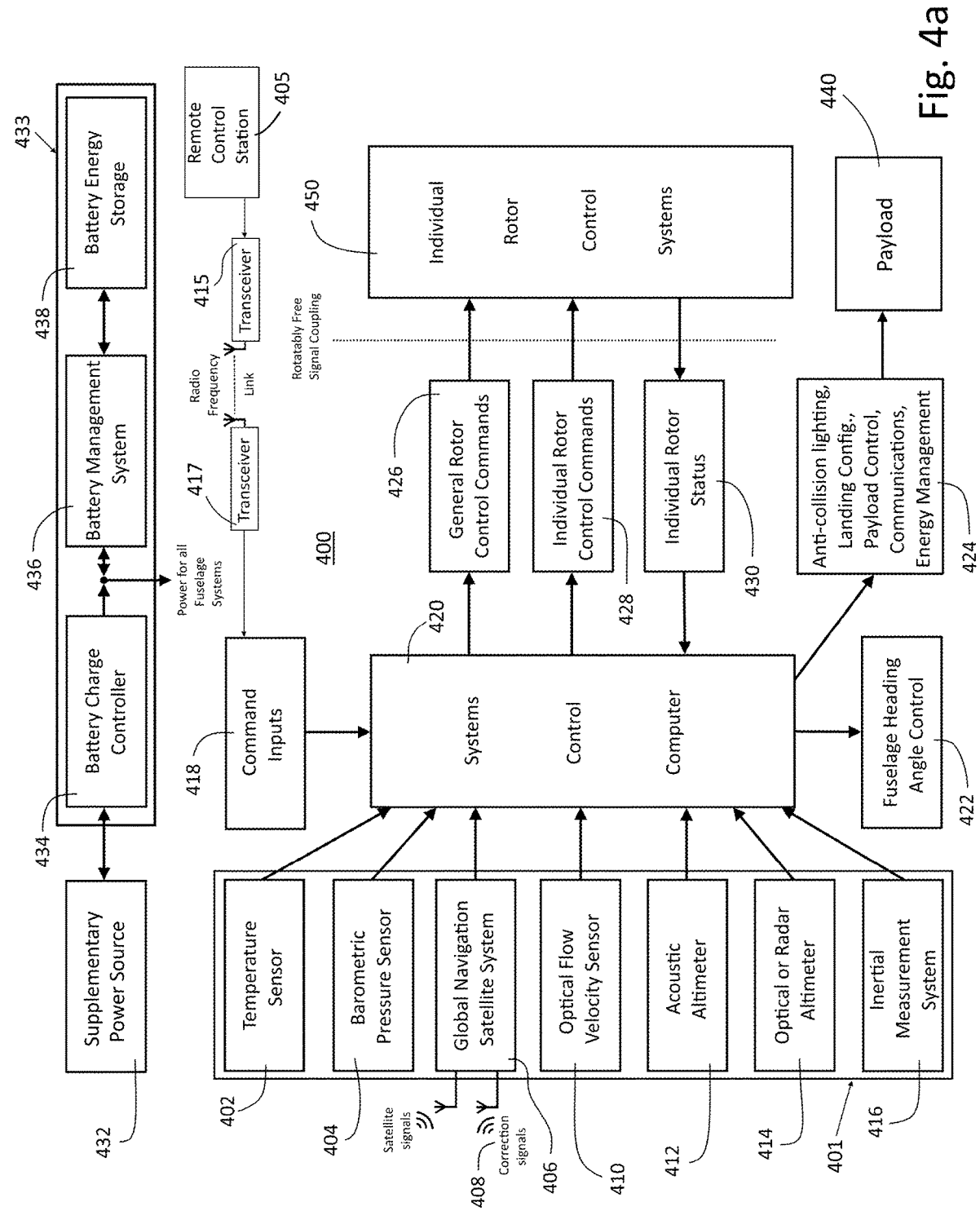
FIG. 4a is a block diagram depicting systems and components of the fuselage of the vehicle.
Figure 4B:
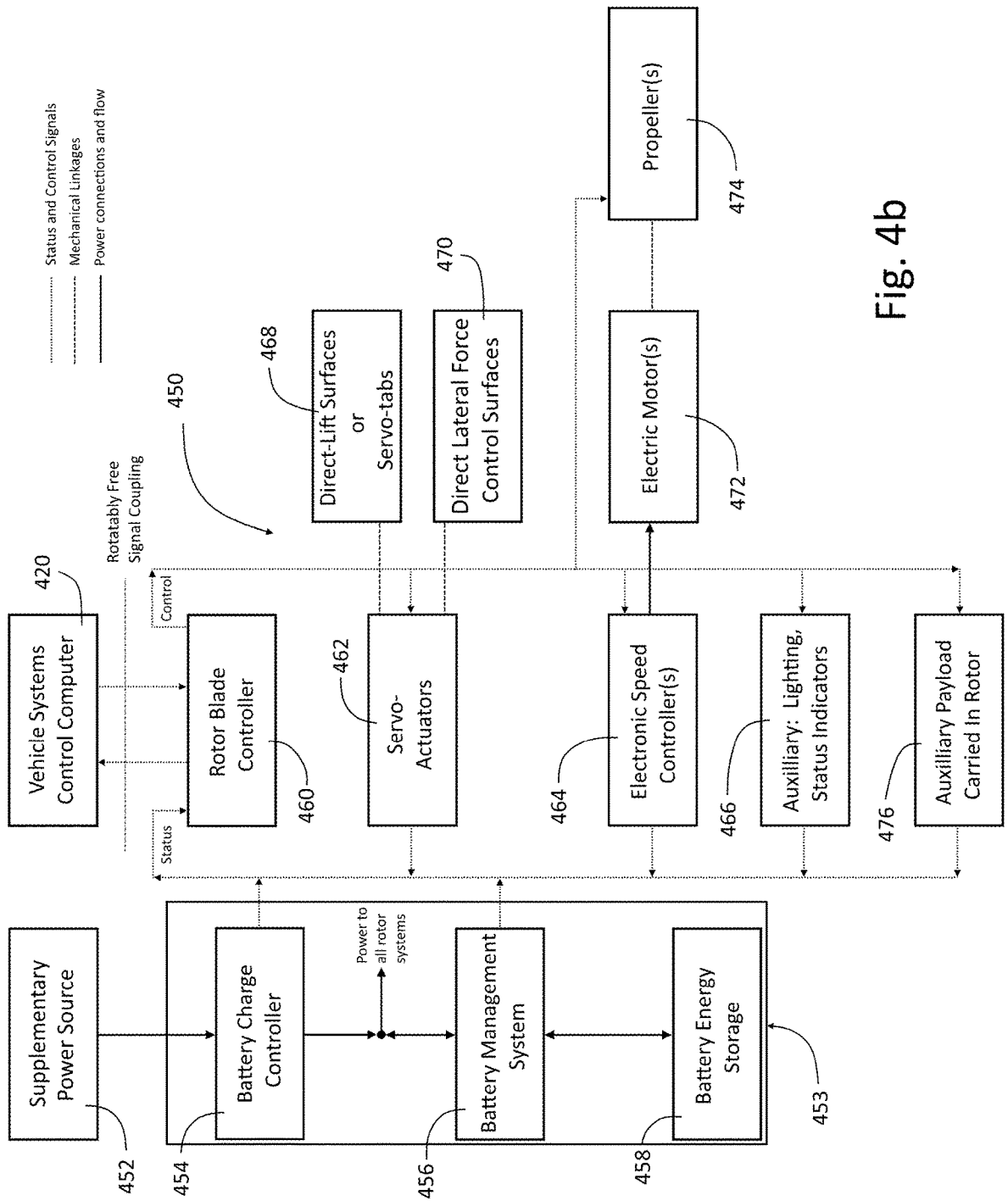
FIG. 4b is a block diagram depicting systems and components of a rotor of the vehicle.
Figure 4C:
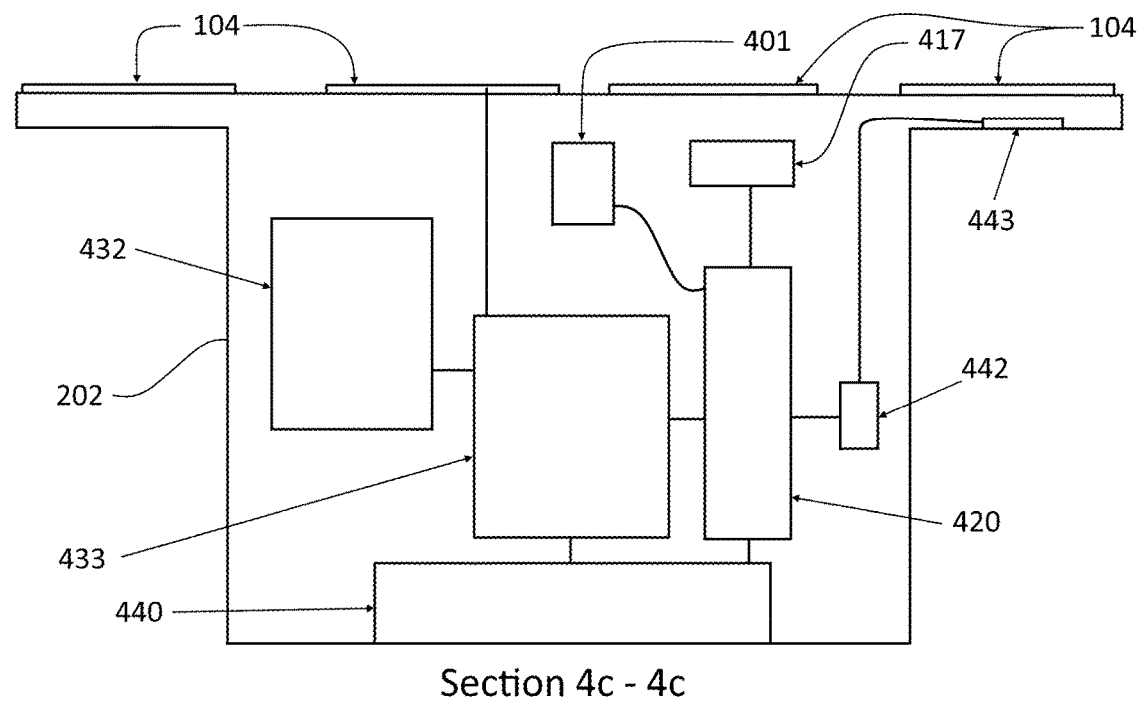
FIG. 4c is a cross-sectional, schematic view taken along lines 4c-4c of FIG. 2.

With specific reference to FIGS. 4a and 4c, electric power for components in the fuselage 102 may be provided by the power supply 433 comprising the battery charge controller 434, the battery management system 436, and the battery energy storage 438. A supplementary power source 432 (which, for example, may comprise an array of solar photovoltaic cells 104), may provide electrical power supplementary to the energy stored in the battery energy storage 438, and may communicate electrical power to the power supply 433. When an excess of electrical power is available from the supplementary power source 432, the excess electrical current may flow, in a manner regulated and controlled by the battery charge controller 434, into the battery energy storage 438 for use at a later time. The battery energy storage 438 may further be protected by the battery management system 436, which may protect the battery energy storage 438 from hazardous conditions such as overcharge, overdischarge, or over-temperature, and help mitigate performance degrading conditions such as excessively low operating temperature or excessively high operating temperature. In some embodiments, supplementary power source 432 may comprise an array of photovoltaic solar cells configured to harvest solar energy from incident sunlight, as available. In other embodiments, supplementary power source 432 may comprise a stored energy source and a means to convert the stored energy into useable electrical power. One example, without limiting others is stored hydrogen, the reaction of which in a hydrogen fuel cell, may generate electrical power. Another example, without limiting others is stored petrochemical fuel such as diesel fuel, which may be burned in an internal combustion engine which may be configured to turn an electrical generator to generate electrical power.

Figure 4D:
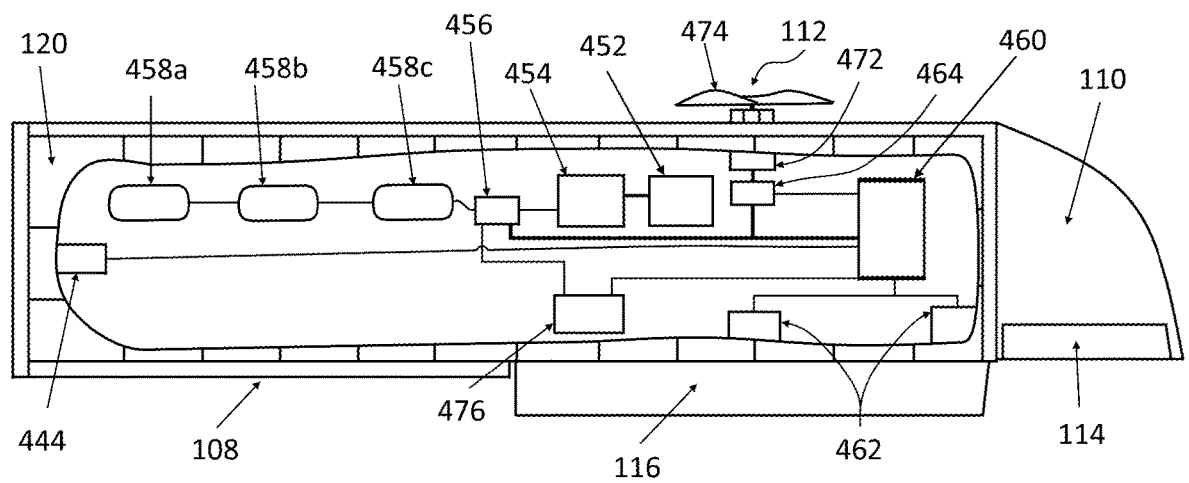
FIG. 4d is a partially cutaway top view of a rotor 180 of a vehicle similar to that shown in FIG. 2 but with a rotor which comprises a single distal tip winglet with a control surface, which winglet is canted outward 45 degrees from vertical.

With specific reference next to FIGS. 4b and 4d, a power supply 453 of the individual rotor system 450 may include power control elements very similar to those in the fuselage as detailed in FIGS. 4a and 4c. A battery energy storage 458 may be present, as well as a supplementary power source 452 (which, for example, may comprise an array of individual solar cells 120) which may provide electrical power supplementary to the energy stored in the battery energy storage 458. When an excess of electrical power is available from the supplementary power source 452 the current may flow, in a manner regulated and controlled by a power conditioner such as a battery charge controller 454, into the battery energy storage 458 for use at a later time. The battery energy storage 458 may further be protected by a battery management system 456, which may protect the battery energy storage 458 from hazardous conditions such as overcharge, over-discharge, or over-temperature, and help mitigate performance-degrading conditions such as excessively low operating temperature or excessively high operating temperature. In some embodiments the battery energy storage 458 may comprise a plurality of separate battery packs 458a, 458b, 458c distributed along the length of the associated rotor 108 so as to distribute battery weight within the length of the rotor 108. In some embodiments, the supplementary power source 452 may comprise an array of photovoltaic solar cells configured to harvest solar energy from incident sunlight, as available. In other embodiments, the supplementary power source may comprise a stored energy source and a means to convert the stored energy into useable electrical power. One example, without limiting others, is stored hydrogen, the reaction of which in a hydrogen fuel cell, may generate electrical power. Another example, without limiting others, is stored petrochemical fuel such as diesel fuel, which may be burned in an internal combustion engine which may be configured to turn an electrical generator to generate electrical power.

Control of the individual rotor system 450 may be provided by a rotor blade controller 460 which may comprise multiple digital and analog computing devices. The rotor blade controller 460 may have facility for non-volatile storage of, for example, program code and calibration data, as well as working memory to be used for calculations and storage of ongoing status data. The rotor blade controller 460 receives commands and sends status information from/to the systems control computer 420 located in the fuselage 102 of the air vehicle 100. As disclosed in the discussion for FIG. 4a, communication between systems control computer 420 and any individual rotor 450 may be accomplished in a variety of ways through rotatably free connections.

Specifically germane to the individual rotor system 450 is the determination of the rotation phase angle or sector of its rotation about the spin axis 118. In operation, the systems control computer 420 may issue a command for a cyclic maximum control effect with respect to its own orientation. To appropriately apply the cyclic control effect throughout the rotation about the spin axis 118 requires the individual rotor to determine its rotational position relative to the fuselage 102 heading orientation. Determination of a particular rotor's rotational position may be accomplished in a variety of ways including, but not limited to, electro-mechanical means such as one or more cams or ramps situated on the non-rotating hub 202 surface so as to engage one or more limit switches mechanically connected to the rotor attachment ring 106 and electrically connected to the rotor blade controller 460 so as to provide an electrically detectable indication of rotational position of the rotor with respect to the fuselage 102. Similarly, rotational position detection may be accomplished using contactless means such as optical photo-detectors or magnetic (e.g. Hall-effect) detectors. As disclosed in the discussion of FIG. 4a, cyclic control commands may be received from the systems control computer 420 as two quantities: a commanded maximum amplitude and a rotational angle at which the maximum commanded amplitude of control is to be applied. The amount of control amplitude applied is the product of the maximum commanded amplitude and the calculated, derived, or specified value of the control profile at any position of the particular rotor as it rotates about the spin axis 118.

Conventional helicopters typically employ a swashplate to cause cyclic control changes. The swashplate directly and mechanically modifies cyclic angle of attack of the rotor blades. The profile is effectively that of a cosine function where the maximum commanded positive control deflection occurs at the maximum deflection angle of the swashplate and the maximum negative (or minimum positive) control deflection occurs at a point 180 degrees around the rotation circle from the maximum deflection angle of the swashplate.

In the illustrated embodiment, the linkage between the controllers and rotors is informational, not a direct, mechanical one. As such, the profile of cyclic control effect can have myriad additional variations. These include but are not limited to profiles such as clipped or saturated cosine functions in which the maximum control deflection is sustained through a larger arc about the spin axis 118 instead of just touching the maximum control deflection at a single point or very small portion of the arc about the spin axis. Likewise, (subject to physical constraints, servo-actuator movement rates, and the like) the cyclic control effect may take the profile of something like a sawtooth or square wave.

And because the specification of maximum control effect is in the form of digital information, the actual effect on the various control elements of each individual rotor may additionally be implemented some rotation angle ahead of or behind the desired control effect position to achieve control results perfectly in keeping with the intended command input from the systems control computer 420. This ability to modify the shape of the control profile, and to 'lead' or 'lag' control inputs for desired effect may additionally be implemented in real time by an adaptive software element of either or both the systems control computer 420 or the rotor blade controller 460 in response to changing atmospheric conditions or vehicle performance requirements.

Implementing desired control functions may be enabled by elements such as electromechanical servo-actuators 462, electronic speed controllers 464, or auxiliary devices 466 in response to control signals provided by the rotor blade controller 460. Auxiliary devices 466 may include, but are not limited to, systems such as anti-collision lighting, aimable communications antennae, visual status indicator lighting, retractable landing gear, and controllable payload features. An auxiliary payload 476 may be carried in individual rotors. Communication between the rotor blade controller 460 and the various components may be accomplished using a methods and communications protocols appropriate to the design and environmental conditions. Examples include, but are not limited to, methods and protocols such as pulse-width modulated power, RS-232c, RS-485, I2C, SPI, and CAN BUS.

The servo-actuators 462 may be located in close proximity to direct-lift or servo-tab control surfaces 468 (comprising elements such as 116 and 526). There may exist a direct, mechanical connection between the servo-actuator 462 and the direct-lift or servo-tab control surfaces 468 and configured to change the location or orientation of the direct-lift or servo-tab control surfaces 468 in order to effect the desired control function, which will ultimately be used to control the position, velocity, and orientation of the air vehicle 100. Likewise, servo-actuators 462 may be mechanically coupled to direct lateral force control surfaces 470 (comprising elements such as 114, 704, and 706) to effect desired control over the state of air vehicle 100.

Electronic speed controllers 464 may be employed to convert command signals from systems control computer 420 through the rotor blade controller 460 into electrical power signals required to drive one or more electric motor(s) 472. The electric motor(s) 472 may turn fans or propellers 474, of either fixed or variably-controlled pitch, to produce aerodynamic forces which will control and sustain rotor ring RPM about spin axis 118 and produce variable aerodynamic forces at different rotation angles or sectors about spin axis 118 to give rise to net direct lateral forces to be used in the control of air vehicle 100.

The rotor blade controller 460 may control the auxiliary payload 476 which may be additionally carried within or attached to the rotor. Properly done, these rotor-carried payloads might range from communications gear and electromagnetic spectrum collection devices (cameras, antennae, magnetic anomaly detectors) to droppable objects intended for delivery at particular locations.

It is to be understood that the physical location and configuration of the various components in the illustrated embodiments are shown by example, and it is contemplated that other specific arrangements can be employed, and may be dependent on the intended flight profiles and missions of the particular embodiment of the air vehicle 100. Variations beyond the embodiments illustrated may be made without departing from the spirit and scope of the present disclosure.

Figure 5A:
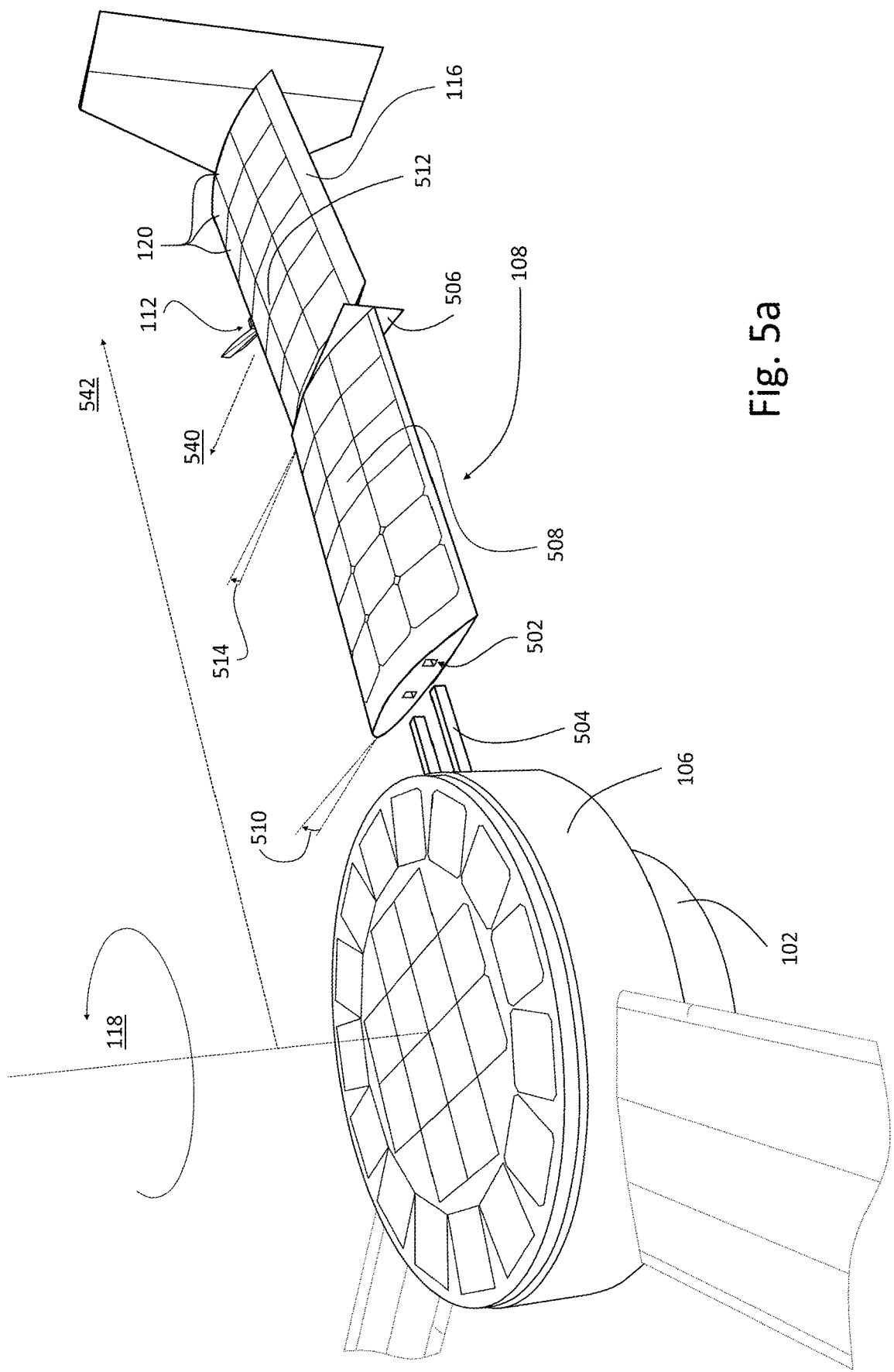
FIG. 5a is a perspective view of a rotor disassembled from a fuselage of the vehicle.

With reference next to FIG. 5*a*, in a preferred embodiment the shape of the rotor 108 may be optimized to best accommodate solar cells 120, which may cover the entirety of the practical area of the upper surface of the rotor 108. The present embodiment provides no mechanical in-flight pitch adjusting mechanism at the root of the rotor blade, such as the linkages to a swashplate mechanism on a conventional helicopter. Instead, a simple, secure attachment may provide structural, mechanical, and data connection between the rotor attachment ring 106 and each rotor 108, providing significant weight savings. Most preferably, the rotor 108 is rigidly attached to the rotor attachment ring 106 at its root. In this example, the rotor 108 has receptacles 502 which accept protruding tangs 504 from the rotor attachment ring 106. The coupling of the tangs 504 into the receptacles 502 may be additionally secured by mechanical fasteners. In other embodiments the protruding tang section may be on the rotor 108 and the receptacle may be on the rotor attachment ring 106. It is contemplated that other structure can also be employed so as to detachably attach each rotor 108 to the rotor attachment ring 106.

Continuing with reference to FIG. 5*a*, the rotor 108 is elongated, and includes an inboard section 508 and an outboard section 512. The rotor inboard section 508 in this embodiment has a single angle of incidence 510 depicted to provide for simplicity of construction. In other embodiments the rotor 108 may have a continuously variable angle of incidence for optimum angle of attack at the design condition (primarily rotor RPM at a particular all-up weight of the vehicle 100) for each spanwise portion of the rotor. The inboard section 508 of the rotor may be separated from the outboard section 512 of the rotor by a winglet, or an aerodynamic fence 506, which is provided to limit spanwise airflow and limit the formation of aerodynamic vortices which can induce additional aerodynamic drag on the rotor 108.

The outboard section 512 of the rotor may have a reduced, constant angle of incidence 514 with respect to that shown by 510 owing to the increased relative wind velocity experienced by the outboard section 512, which causes a lower required angle of attack for optimum flight conditions. As with the inboard section 508, the outboard section 512 may have a continuously variable angle of incidence constructed into the structure for optimum flight performance at the design flight condition. Depicted in FIG. 5*a* is a rotor outboard section 512 with a lift-force control surface 116 affixed at its trailing edge. This lift-force control surface 116 may be adjusted by electromechanical servo-actuators mounted within or on the corpus of the rotor 108 to an average deflection amount to control the total lift generated by the rotors, and it may be further adjusted to different positions by servo-actuators as the rotor spins through different sectors around spin axis 118 to produce maneuvering forces and moments generated by the rotors.

Located at a point along the rotor outboard section 512 is the thrust generator 112 depicted in this embodiment as an electric motor and propeller. In one preferred embodiment the thrust generator 112 may be oriented to produce thrust along a line 540 both perpendicular to a line extending radially outward from the center of rotation 542 and perpendicular to the spin axis 118 of the rotor system of the vehicle 100. This arrangement maximizes the amount of thrust available to maintain rotor RPM.

Figure 5B:
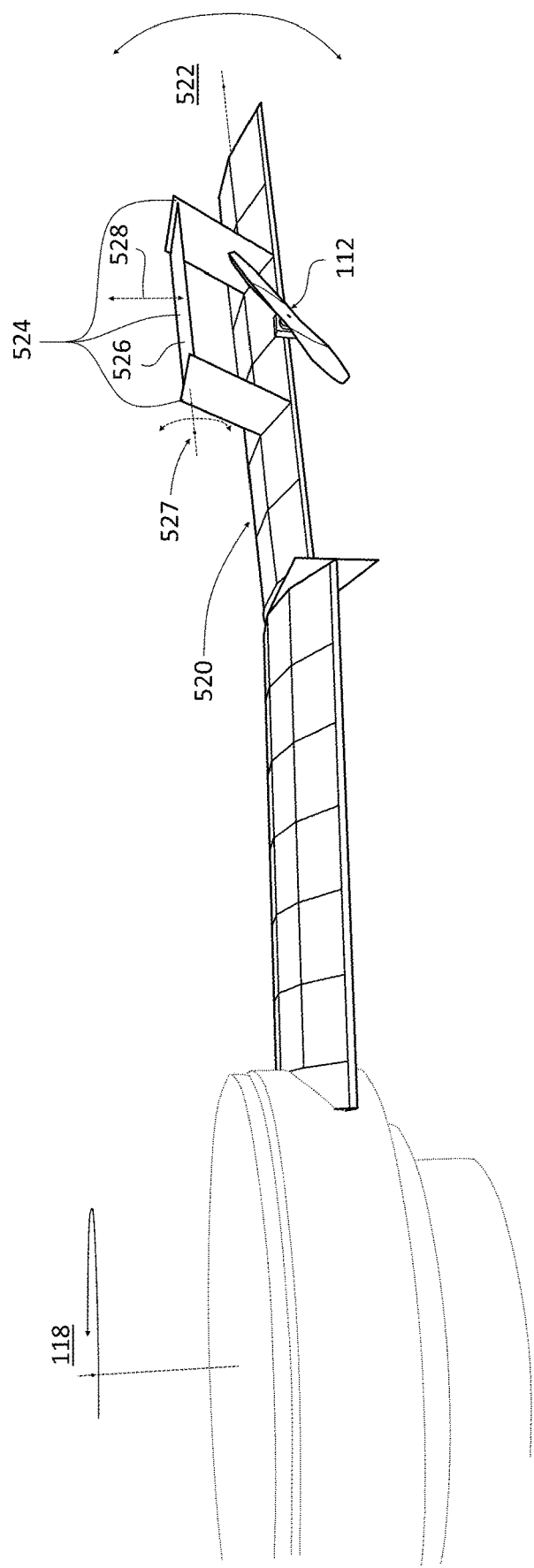
FIG. 5b is a back view of another embodiment of a rotor.

With reference next to FIG. 5*b*, in another embodiment, the rotor outboard section 512 comprises a feathering wing section. For clarity, this example does not include a winglet at the distal tip of the rotor. Various embodiments may include or not include the winglet without departing from the spirit or scope of the present disclosure.

An outer feathering wing section 520 may be free to rotate about a feathering axis 522 and may utilize a servo-tab or full-flying aerodynamic stabilizer assembly 524 to determine the rotational position of wing section 520 about the feathering axis 522. It is to be understood that the stabilizer assembly acts much the same as a trim-tab on aerodynamic or hydrodynamic surfaces. The stabilizer assembly 524 is mounted away from the main body of wing section 520 so as to be in relatively undisturbed airflow, and mounted aft of the feathering axis 522 so as to generate a torque about feathering axis 522. In this example embodiment, the thrust generator 112 comprises an electric motor driving a propeller arrayed in the pusher configuration.

The stabilizer assembly 524 may employ an electromechanical servo-actuator to drive a full-flying stabilizer 526 to rotate about its aerodynamic center 527 through different angles of attack so that it generates a lift force 528, which causes a torque moment about the feathering axis 522. This torque moment in turn rotates outboard feathering wing section 520 to an angle of attack with respect to the relative wind necessary to cause wing section 520 to generate a desired amount of lift force at any portion of its rotation about the spin axis 118. An alternative embodiment may omit the aerodynamic stabilizer assembly 524 altogether and provide for directly driving the angle of the feathering wing section 520 about feathering axis 522 with an electromechanical servo-actuator. Other possible embodiments may include multiple feathering wing sections present in the rotor outboard section 512, or a combination of rotor sections distributed spanwise that are a combination of rotor sections which use either, both, or multiple instances of the lift force control surface (Reference FIG. 5a-116) and/or the full feathering wing section 520 arrangement. Any section of the rotor that articulates by feathering may better facilitate auto-rotation if power should be lost. It does so by allowing an angle of attack of the outboard wing section 520 in descent that generates a lift force generally opposite the descent direction while maintaining or increasing rotor RPM.

Figure 5C:
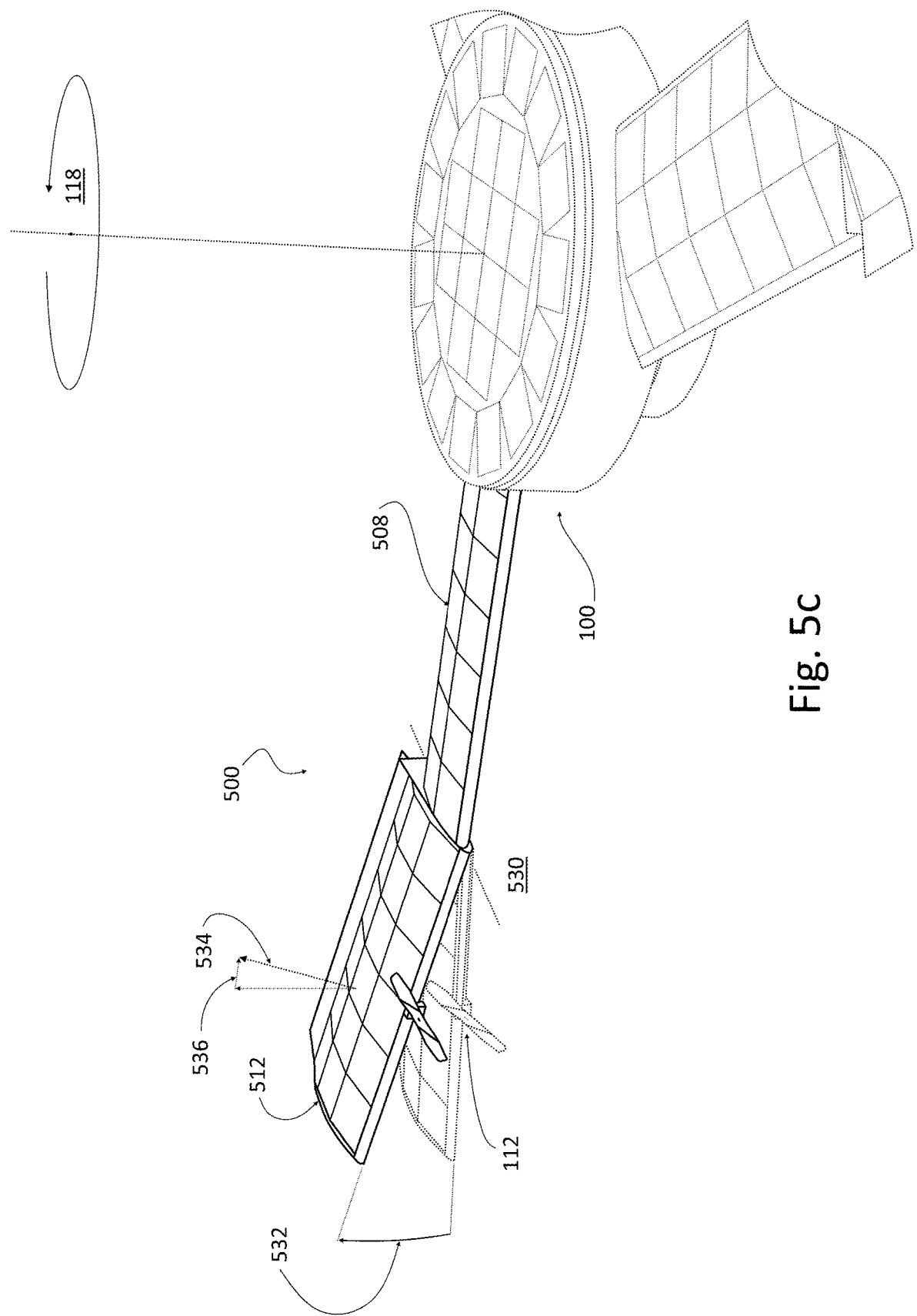
FIG. 5c is a front view of yet another embodiment of a rotor.

With next reference to FIG. 5c, in another embodiment, a flapping hinge axis 530 may be provided for at an intermediate location along the span of the rotor 108 between the inboard section 508 and the rotor outboard section 512. The hinge mechanism may comprise a mechanical hinge mechanism with the conventional parts of leafs, knuckle, and pin. In other embodiments, the hinge mechanism may simply comprise one or more flat, spring-steel straps securely bonded into the structures of rotor inboard section 508 and rotor outboard section 512 and configured so as to allow flexure about hinge axis 530 while substantially constraining movement in other directions and about other axes. As in FIG. 5a, this embodiment depicts the thrust generator 112 in the tractor (pulling) configuration. As in FIG. 5b, for clarity, this example does not depict a winglet at the distal tip of the rotor. The illustrated flapping hinge axis 530 is generally horizontal and perpendicular to the longest axis of the blade of rotor 108. While not located at the root of the rotor 108, which is the case on a conventional helicopter, the illustrated flapping hinge axis 530 serves a similar purpose of stability augmentation as the root-located flapping hinge of a conventional helicopter. As the rotor 108 encounters a faster relative wind due to the free-stream wind speed caused by motion of vehicle 100 with respect to the surrounding air mass, the rotor 108 will generate relatively more lift force. This portion of the rotor disk is referred to as the 'advancing' side. The flapping hinge with axis 530 shown allows the rotor outboard section 512 to rotate upward due to the increased lift force. Centrifugal force experienced by the rotor outboard section 512 limits the upward flapping angle 532. As rotor outboard section 512 rotates upward it effectively experiences a reduced angle of attack into the relative wind. The reduced angle of attack causes the outboard rotor section to produce slightly less lift. Eventually, and typically at 90 degrees rotation about the spin axis 118 from the peak increased relative wind direction, the rotor outboard section 512 ceases to rotate upward about the flapping hinge with axis 530 and begins to rotate downward, causing an apparent increase in its angle of attack just as its relative wind speed is decreasing due to the free-stream wind speed occurring in a direction opposite the relative wind speed caused by the rotor's rotation about the spin axis 118. Thus the lift force generated on the so-called 'retreating' side of the rotor disk is caused to be greater than without the flapping hinge. Differences in lift generated on the advancing side of the rotor disk compared to the retreating side can cause significant rolling moments (pitching moments if the free-stream wind speed is from the side) which can upset the controlled flight of the vehicle. So the addition of a flapping hinge causes a decrease in the excess lift otherwise generated on the advancing side of the rotor disk and an increase in the otherwise deficit of lift otherwise generated on the retreating side of the rotor disk to mitigate any rolling (or pitching) moments that might introduce vehicle control issues. Additionally, as the flapping hinge with axis 530 allows the rotor outboard section 512 to rotate upward it causes the lift vector 534 generated by the rotor outboard section 512 to tilt opposite the direction of relative movement of vehicle 100 through the surrounding air mass, producing the stabilizing force 536, thus reducing the velocity of vehicle 100 through the surrounding air mass, thus reducing the upsetting forces on the vehicle.

With reference to FIG. 6, the thrust generators 112a, 112b, 112c act to maintain the spin RPM of the rotor system while also generating an aggregate net direct lateral force by modulating thrust within different sectors of each rotor's rotation about the spin axis 118. Production of direct lateral force is important because it allows for precise, immediate control of the position and velocity of the air vehicle 100 without requiring tipping of the rotor disk described by the sweep of the rotors in their rotation about the spin axis 118. The rotor disk, owing to the spinning mass of the rotors, behaves much like a gyroscope with its attendant resistance to change in orientation and non-intuitive axis of response (gyroscopic precession) to application of orientation-changing forces. These tendencies, while unavoidable for the general modes of flight of vehicles of this sort, can cause significant difficulty when attempting to perform small, precise maneuvers, where immediate, predictable response is required for acceptable control.

As detailed in FIG. 4b, the rotor blade controller 460 may send command signals to the electronic speed controller 464, which controls electrical power to the electric motor 472, which drives a fixed- or variable-pitch propeller. The signal from the rotor blade controller 460 for that particular rotor's thrust generator controls the amount of thrust produced for the particular rotor. This signal from the rotor blade controller 460 may be varied many times throughout the rotor's movement in its rotation about the spin axis 118. These variations in thrust serve to stabilize and control the position, velocity, and orientation of the air vehicle 100.

In FIG. 6, rotors are depicted in a variety of locations as they rotate about the spin axis 118 of the vehicle. If the desired effect is to create a net force on the air vehicle 100 that is directed along the net maneuvering force vector 602, then command signals, and therefore thrust produced, may be varied to produce an appropriate net thrust force on the vehicle 100 while still maintaining rotor RPM, which is needed to sustain flight. It is to be understood that the six discrete positions shown are merely examples, and that the rotor blade controller 460 will issue commands for different thrust amounts on a substantially continual basis as is appropriate for any angular position as the rotor blade 108 rotates about spin axis 118.

At location 600a the thrust generator is pointed in a direction where its effect will have the maximum contribution to the desired net maneuvering force vector 602 so its thrust 604a may be commanded to be substantially greater than an average thrust amount. Here 'average thrust amount' means that needed to generally sustain or control the rotor RPM. At location 600b the thrust generator is pointed in a direction nearly perpendicular, but slightly opposed to the desired net force vector 602 so its thrust amount 604b may be somewhat less than the average thrust amount.

Location 600c depicts an angular position with direction of thrust 604c nearly perpendicular to the desired net force vector 602 and slightly opposed to the desired net force vector 602. Here the expected amount of thrust production may be slightly less than the average thrust amount.

Locations 600d, 600e, 600f represent opposite sides of each of the respective angular positions 600a, 600b, 600c. In these positions the respective amounts of thrust 604d, 604e, 604f may be expected to be roughly the sum of the average thrust amount minus the surplus or deficit thrust amount of their counterpart removed by 180 degrees of rotation across the rotor disk. The thrust 604d may be significantly less than the average thrust amount owing to its direction opposite the desired net force vector 602. In fact, the net thrust at location 600d, considering the aerodynamic drag of the thrust generator, may actually be opposite (a net drag force) the usual acting direction of its thrust generator.

The thrust generated as 604e may be slightly more than the average thrust amount owing to the fact that the direction of thrust generation begins to align with the direction of desired net maneuvering force vector 602. Finally, because the direction of thrust 604f is somewhat aligned with the direction of desired net force vector 602 the amount of thrust, similar to at location 600e, may be slightly more than the average thrust amount needed to sustain or change rotor RPM.

Figure 7A:
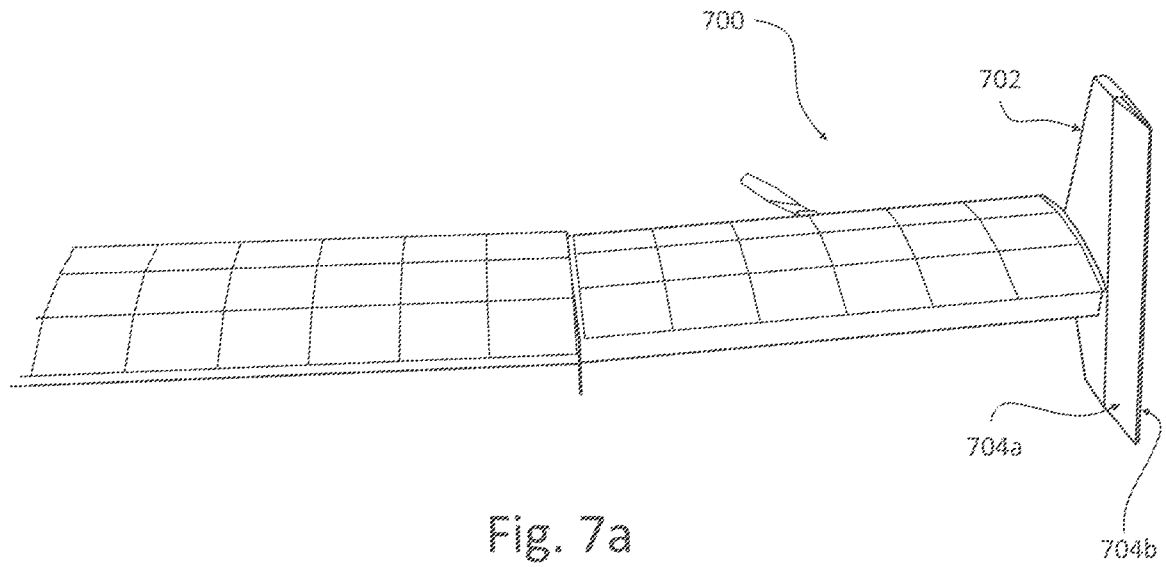
FIG. 7a is a partial view of an embodiment of a rotor having a winglet with control surfaces.
Figure 7B:
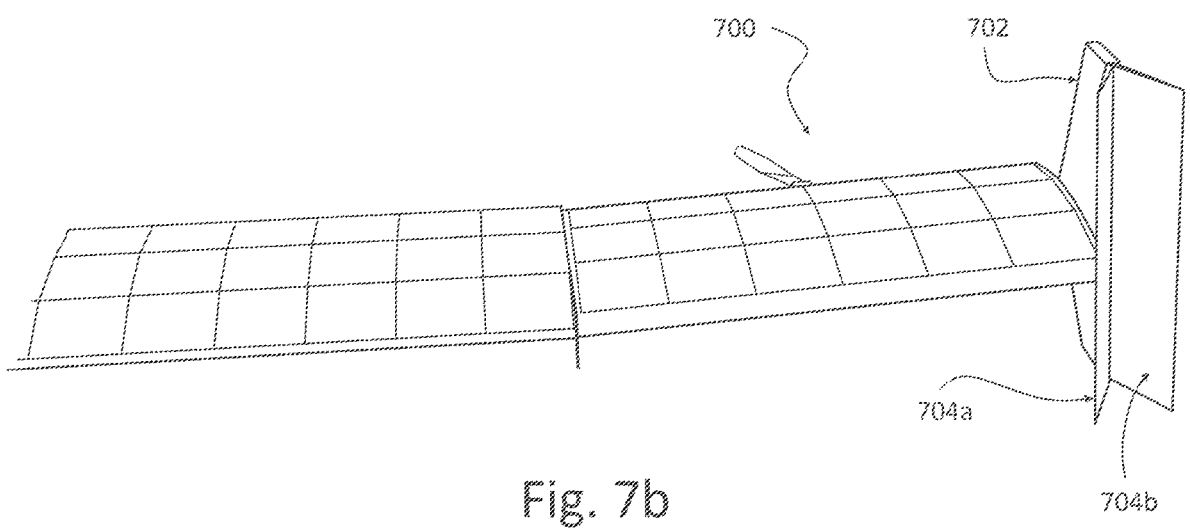
FIG. 7b shows the rotor of FIG. 7a with the control surfaces in a different configuration.
Figure 7C:
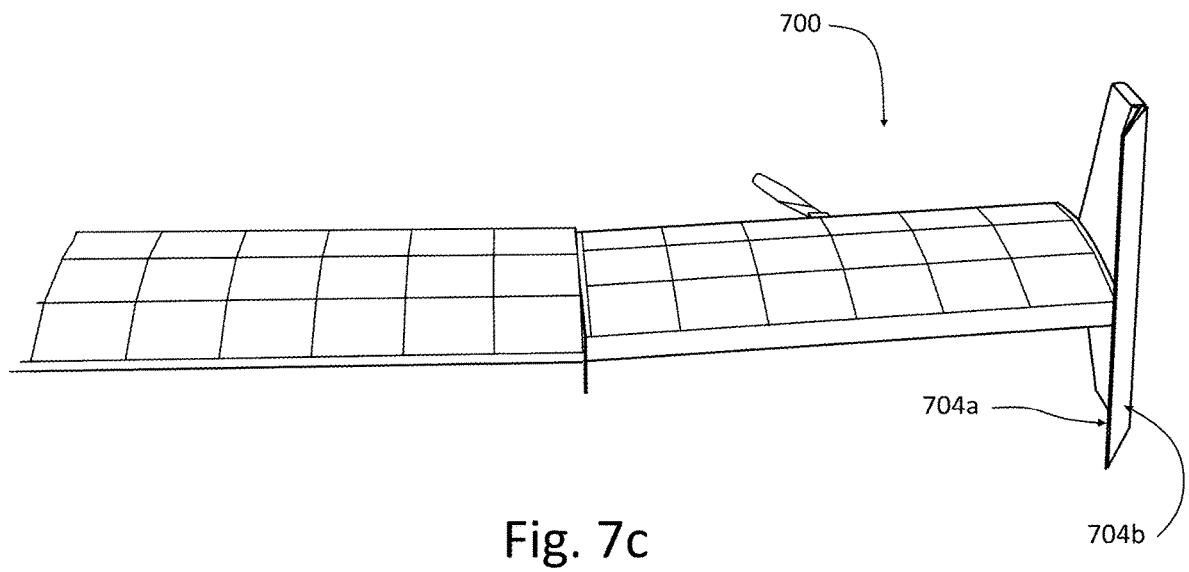
FIG. 7c shows the rotor of FIG. 7a with the control surfaces in another different configuration.
Figure 7D:
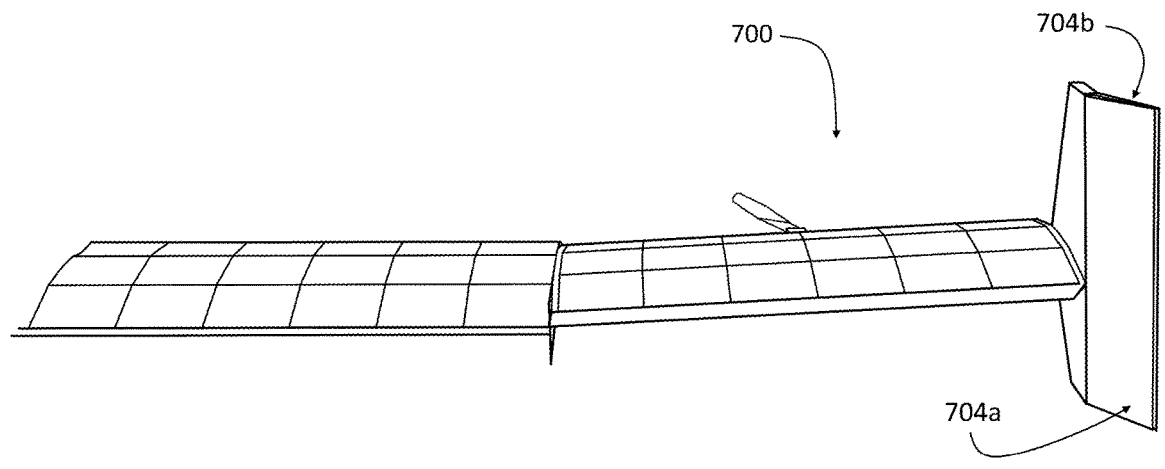
FIG. 7d shows the rotor of FIG. 7a with the control surfaces in yet another different configuration.
Figure 7E:
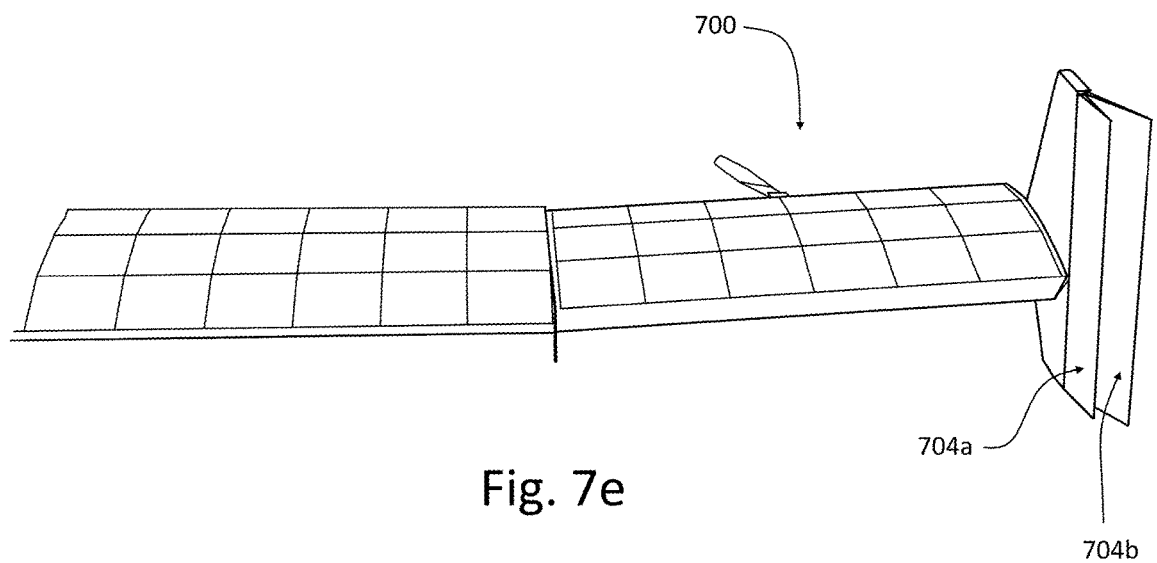
FIG. 7e shows the rotor of FIG. 7a with the control surfaces in still another different configuration.

With reference next to FIGS. 7a-e, an embodiment of a rotor outboard section 700 includes a rotor-tip winglet 702 having a pair of independently-operable direct force control surfaces 704a, 704b at its trailing edge. It is to be understood that locating the winglet at the distal tip of the rotor accrues the advantage of reducing induced drag on the rotor, but is not strictly necessary for generating the cyclic forces comprising a net lateral control force described hereafter. Winglets and aerodynamic fences may be arrayed on any portion of the outboard section of a rotor and still generate aerodynamic forces which are useful for control and maneuvering of the aircraft. Positioning the control surfaces 704a, 704b in various configurations can generate net direct lateral force by modulating lift and drag force at the winglet location within different sectors of each rotor's rotation about the spin axis 118. In FIG. 7a, the control surfaces 704a, 704b are in contact with one another and in line with the chord line of the winglet. This represents the minimum drag configuration, which also generates no lateral lift force. FIG. 7b depicts a configuration in which control surfaces 704a, 704b are deployed symmetrically in their maximum drag configuration, which generates substantially no lateral lift force. FIGS. 7c and 7d depict control surfaces 704a, 704b in configurations where a radially outward lateral lift force and a radially inward lateral lift force are respectively generated. FIG. 7e illustrates a configuration of control surfaces 704a, 704b made to generate both a significant radially inward lift force and a significant tangential drag force at the same time.

Figure 7F:
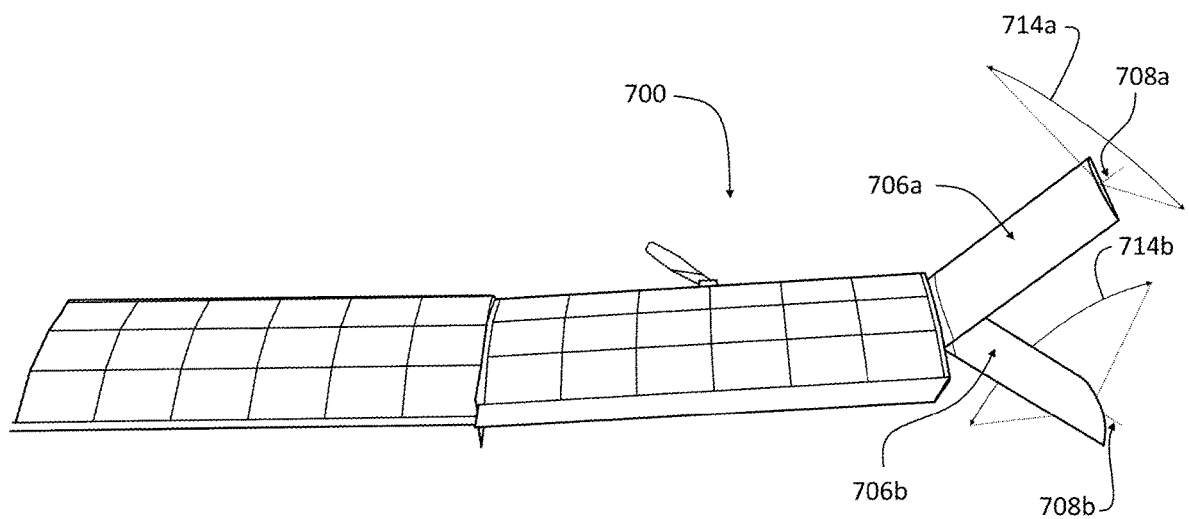
FIG. 7f shows another embodiment of a rotor having winglet control surfaces.

FIG. 7f depicts another embodiment in which a rotor outboard section 700 features two winglets 706a, 706b arrayed in a 'Y' configuration at the distal tip of the rotor outboard section 700. Each winglet 706a, 706b is separately controlled and operated. The body of each winglet 706a, 706b may be rotated through angles 714a, 714b respectively to produce different amounts of 'lift' force and 'drag' force, which combine to yield a composite force that can be beneficial for vehicle control. Here 'lift' force means that force direction perpendicular to the relative wind and 'drag' force means that force direction parallel and in the same direction as the relative wind. The bodies of winglets 706a, 706b may be rotated differentially or together about axes 708a, 708b, or independently without direct consideration of the position of the other to generate vertical and radial forces on the rotor outboard section 700 and, in turn, on the air vehicle. It is to be understood that this configuration works somewhat similarly to the operation of the empennage of a V-tail configured aircraft.

Figure 7G:
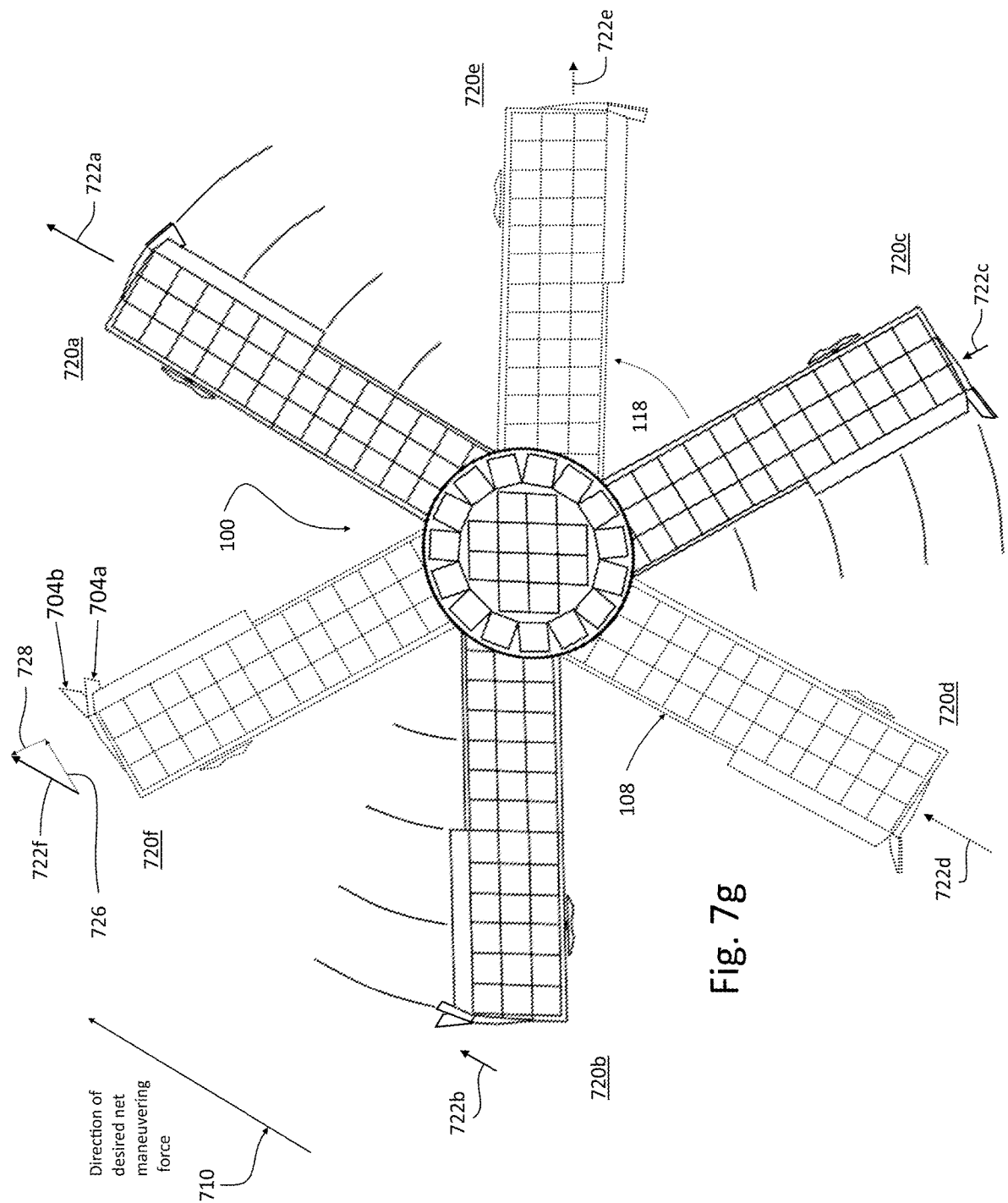
FIG. 7g is a top view of a vehicle having a rotor as in FIG. 7a, depicting the generation of lateral forces of the rotor at multiple locations about its rotation.

FIG. 7g illustrates operation of an embodiment having rotors with the winglet 702 and control surfaces 704a, 704b of the configuration discussed in connection with FIGS. 7a through 7e. As shown, the control surfaces 704a, 704b can be independently manipulated and positioned about the entirety of the rotor arc to generate a desired control effect. In the illustrated example, the desired effect is to create a net force on the air vehicle 100 that is directed along the net maneuvering force vector 710. Command signals for the lateral force control surfaces may be varied to accomplish this, and it is to be understood that any additional drag created by deflection of direct force control surfaces 704a, 704b may need to be compensated for by the thrust generators in order to maintain the desired rotor RPM. As detailed in FIG. 6, additional thrust may be applied selectively throughout the rotation of the rotors to both maintain rotor RPM and to generate additional net force in the desired direction.

In FIG. 7g, location 720f, the direct force control surfaces 704a, 704b are deflected differentially inboard and outboard as shown to produce the composite force 722f. The composite force 722f results from the vector combination of the drag force 726 and the radially outward 'lift' force 728. In most angular positions, proper direct force control surface deflections will produce 'lift' and 'drag' forces that will yield a composite force aligned along the direction of the desired net maneuvering force vector 710. It is to be understood that the six discrete positions shown are merely examples, and that the rotor blade controller 460 will issue commands for control surfaces 704a, 704b deflection on a substantially continual basis as is appropriate for any angular position as the rotor blade 108 rotates about spin axis 118.

At location 720a the direct force control surfaces 704a, 704b are deflected inboard and together to produce a radially outward lift force 722a. In this case the drag force generated is a small fraction of the lift force and has minimal influence on the resultant force 722a.

At location 720b the direct force control surfaces 704a, 704b are deflected differentially—one inboard and the other slightly more outboard so that the combined force 722b is substantially along the direction of the desired net maneuvering force vector 710.

At location 720c the direct force control surfaces 704a, 704b are deflected together and radially outward to produce a radially inward force 722c. In this case, there is no possible configuration for the control force surfaces that will produce a force that is well-aligned with the desired net maneuvering force vector 710.

At location 720d the direct force control surfaces 704a, 704b are deflected radially outward to produce a force 722d that is directed radially inward. This is the control position in direct opposition of the force vector 710 on the rotor arc, yet by properly configuring the direct force control surfaces it is possible to produce a force in the direction of the desired net maneuvering force vector 710.

At location 720e the rotor is moving nearly in the direction of the desired net maneuvering force vector 710, so very little control input is possible that will produce a force in the desired direction. This position can however be used to produce a small force 722e to offset any residual forces generated in other parts of the rotor sweep that were not perfectly aligned with the desired net maneuvering force vector 710.

FIG. 8 depicts one example of a long-endurance embodiment of the present invention. The rotor span is approximately 8 meters. The long-endurance air vehicle 800 may share similarities with utility air vehicle 100 where economies of scale may be realized using common elements. The surface area and shape of the rotors 808a, 808b, 808c may be designed to optimize the structural integrity of the rotor, aerodynamic efficiency of the rotor, propulsive efficiency of the rotor, the coverage area of commercially available photovoltaic cells, and use of readily available, mass-produced components. The structure of any embodiment of the present invention may include structural features designed to optimize weight and manufacturing cost by finding appropriate trade-offs between competing factors. One example of this, without limiting others, is the practice of distributing along the span the relatively heavy energy storage batteries required for long endurance to reduce in-flight bending loads on the wing, while mitigating and accommodating the centrifugal force which the mass of the batteries will impose on the rotor structure as it rotates about the spin axis 118. Another example, without limiting others, is the choice of rotor blade chord and span length of the various sections to provide rotor blade upper surface area that optimizes lift produced against ready accommodation of a practical number of photovoltaic cells for solar energy collection as a supplementary power source.

Figure 9:
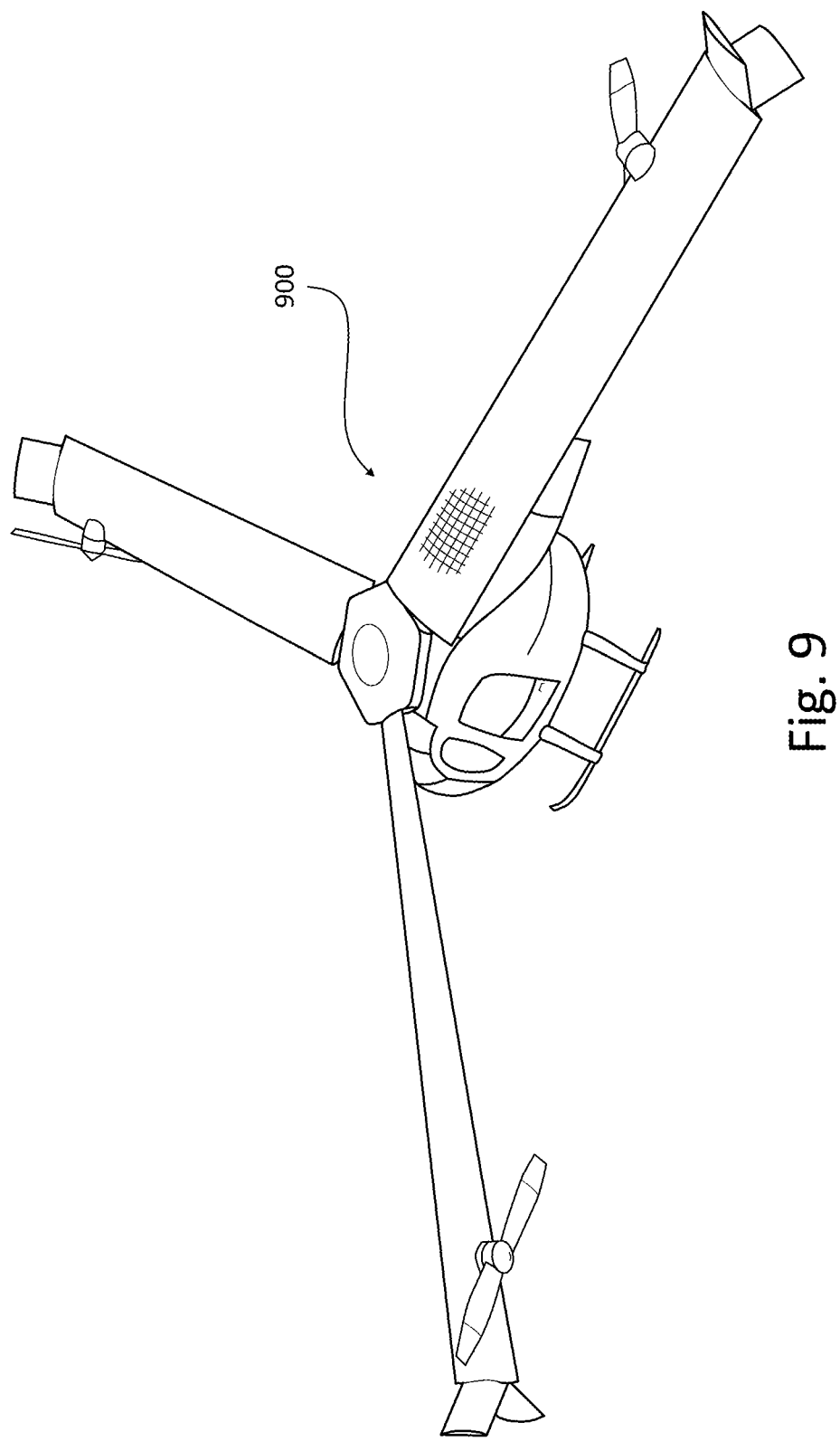
FIG. 9 is a perspective view of yet another embodiment of a utility air vehicle configured to carry a crew.

FIG. 9 depicts one possible embodiment of the present invention which may serve as a crewed transportation vehicle 900. The rotor span for the example embodiment shown in as vehicle 900 is approximately 14 meters. In this example embodiment the minimalistic cylindrical fuselage of utility air vehicle 100 is replaced with one better configured for crew control, comfort, and safety accommodations. Because of the reversibility of electric motors it may be possible to (inefficiently) generate reverse thrust from the thrust generators to reduce the speed of and to quickly stop the spinning of the main rotors to expedite loading and unloading the vehicle.

It is to be understood that the principles discussed herein can be applied to many flight missions and profiles currently performed by other uncrewed and crewed flight vehicles. Carriage of a wide variety of mission payloads (e.g. communications repeaters; intelligence, surveillance, and reconnaissance equipment; critical items to be delivered for humanitarian purposes) and flight profiles (e.g. extreme high-altitude flight to avoid weather, nap-of-the-earth flight to avoid winds or detection by hostile actors) may entail structural adjustments while still applying inventive principles.

The embodiments discussed above have disclosed structures with substantial specificity. This has provided a good context for disclosing and discussing inventive subject matter. However, it is to be understood that other embodiments may employ different specific structural shapes and interactions.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A rotary wing aircraft comprising:
    a non-rotating fuselage comprising a containing volume configured to house power, sensing, and control elements, and to support a payload;
    a vehicle systems control computer housed within the fuselage configured to control the rotary wing aircraft;
    a rotor attachment ring adjacent to and around part of the fuselage and configured to rotate relative to the fuselage about an upright spin axis;
    a heading angle control system configured to control a fuselage heading orientation; a plurality of rotors attached to the rotor attachment ring extending radially outward from the rotor attachment ring and configured to generate a desired net maneuvering force vector of the rotary wing aircraft, wherein each of the plurality of rotors comprises:
        a rotor blade comprising an airfoil shape in the plane perpendicular to a longest axis of the rotor blade;
        a power supply;
        a thrust generator;
        one or more aerodynamic lift altering control surfaces; a rotor blade controller configured to control the rotor blade to maintain the net maneuvering force vector;
        wherein the rotor blade controller is configured to both generate thrust forces sufficient to control and sustain the rotation rate of the rotor attachment ring and the attached plurality of rotors, and to control a desired force vector of the rotor blade to maintain the desired net maneuvering force vector by controlling the thrust generator and the aerodynamic lift altering control surfaces based on rotational positioning of the rotor blade as the rotor blade rotates through particular sectors with respect to the fuselage heading orientation; and wherein the power supply is configured to communicate electric power to the thrust generator.

2. The rotary wing aircraft of claim 1, further comprising:

at least two winglets disposed on the outer portion of each rotor and configured to move in their respective entirety, or to have at least one winglet that is rigidly fixed to the rotor, having at least two moveable control surfaces attached to the winglet;

at least one actuator attached to each winglet or to each control surface;

each actuator configured to move the whole of the winglet or the control surfaces attached to the winglet;

the rotor blade controller configured to independently control each actuator so that the movement of each winglet or control surface is either in concert with or in opposition to other winglets or control surfaces;

each movement of the winglets or the control surfaces coordinated and cyclically controlled by the rotor blade controller to generate lateral lift and drag aerodynamic forces to control the desired force vector of the rotor blade; and wherein there is no requirement to tilt a plane of the rotor disk for lateral control of the rotary wing aircraft.

3. The rotary wing aircraft of claim 1, further comprising:

at least one of the plurality of rotors which is a modularly replaceable, self-powered individual rotor;

each modularly replaceable, self-powered rotor also comprising a supplementary power source configured to provide electrical power to the power supply which, in turn, is configured to provide excess electrical power to charge a battery energy storage for use at a later time;

wherein the supplementary power source is capable of providing power to recharge the battery energy storage whether or not the rotor is connected to the rotary wing aircraft.

4. The rotary wing aircraft of claim 1, wherein the vehicle systems control computer is configured to accept command inputs from onboard autonomous processing elements.

5. The rotary wing aircraft of claim 1, further comprising:

one or more supplementary power sources housed in the fuselage;

at least one of the supplementary power sources comprising an array of photovoltaic cells disposed on the upper surfaces of the fuselage configured to harvest solar energy and communicate electrical power to the power supply within the fuselage.

6. The rotary wing aircraft of claim 1, further comprising:

one or more supplementary power sources housed on one or more of the aircraft's plurality of rotors;

at least one of the supplementary power sources comprising an array of photovoltaic cells disposed on the upper surfaces of each rotor configured to harvest solar energy and communicate electrical power to each respective rotor's power supply.

* * * * *